(12) United States Patent
Masuda et al.

(10) Patent No.: US 11,597,056 B2
(45) Date of Patent: Mar. 7, 2023

(54) APPARATUS AND METHOD FOR ASSISTING GRINDING MACHINE

(71) Applicant: JTEKT CORPORATION, Osaka (JP)

(72) Inventors: Yuki Masuda, Nagoya (JP); Toru Kawahara, Chita-gun (JP); Shinji Murakami, Toyota (JP)

(73) Assignee: JTEKT CORPORATION, Kariya (JP)

( * ) Notice: Subject to any disclaimer, the term of this patent is extended or adjusted under 35 U.S.C. 154(b) by 437 days.

(21) Appl. No.: 16/826,354

(22) Filed: Mar. 23, 2020

(65) Prior Publication Data

US 2020/0306928 A1  Oct. 1, 2020

(30) Foreign Application Priority Data

Mar. 27, 2019 (JP) .............................. JP2019-059569

(51) Int. Cl.
*G05B 15/02* (2006.01)
*B24B 49/04* (2006.01)
*B24B 49/14* (2006.01)

(52) U.S. Cl.
CPC .............. *B24B 49/04* (2013.01); *B24B 49/14* (2013.01); *G05B 15/02* (2013.01); *G05B 2219/34082* (2013.01)

(58) Field of Classification Search
CPC .......... B24B 49/04; B24B 49/14; B24B 1/00; B24B 41/00; B24B 51/00; G06N 20/00;
(Continued)

(56) References Cited

U.S. PATENT DOCUMENTS

| 2012/0191235 | A1* | 7/2012 | Shin ..................... G06Q 10/067 700/104 |
| 2013/0153694 | A1* | 6/2013 | Held ...................... G05B 15/02 241/34 |
| 2019/0291270 | A1* | 9/2019 | Kiyama ............... B25J 11/0065 |

FOREIGN PATENT DOCUMENTS

| JP | H03-239469 | 10/1991 |
| JP | 2017-068566 | 4/2017 |

(Continued)

OTHER PUBLICATIONS

Malakooti et al. "Multiple criteria approach and generation of efficient alternatives for machine-part family formation in group technology" from "IIE Transactions (2002) 34, 837-846" (Year: 2002).*

(Continued)

*Primary Examiner* — Yuhui R Pan
(74) *Attorney, Agent, or Firm* — Oblon, McClelland, Maier & Neustadt, L.L.P.

(57) ABSTRACT

An assistance apparatus includes a status information acquiring section that acquires a grinding condition as a status information, the grinding condition including set states associated with a plurality of movement command data, an evaluation result acquiring section that acquires evaluation results of a plurality of evaluation objects that are obtained under the grinding condition, a reward calculating section that calculates a reward for the status information based on the evaluation results, a policy storing section that stores a policy which is obtained from a value function, an action determining section that determines the movement command data to be adjusted and an adjustment amount at which said movement command data is adjusted, from among candidates of the plurality of movement command data that are adjustable, based on the status information and the policy, and an action information outputting section that
(Continued)

is configured to output determined contents including an action information.

20 Claims, 10 Drawing Sheets

(58) Field of Classification Search
CPC ......... G06Q 10/06393; G06Q 10/1053; G06Q 50/04; G05B 15/02; G05B 2219/34082
See application file for complete search history.

(56) References Cited

FOREIGN PATENT DOCUMENTS

| | | |
|---|---|---|
| JP | 2018-051646 A | 4/2018 |
| JP | 2018-097680 | 6/2018 |
| JP | 2018-106417 | 7/2018 |
| JP | 2018-120453 | 8/2018 |

OTHER PUBLICATIONS

Office Action dated Dec. 6, 2022 in Japanese Application No. 2019-059569, along with an English translation, citing references 15-19 therein.

\* cited by examiner

APPARATUS AND METHOD FOR ASSISTING GRINDING MACHINE

CROSS-REFERENCE TO RELATED APPLICATIONS

This application is based on and claims priority under 35 USC 119 from Japanese Patent Application No. 2019-059569 filed on Mar. 27, 2019, the contents of which are incorporated herein by reference.

TECHNICAL FIELD

The present disclosure relates to an apparatus and method for assisting a grinding machine.

BACKGROUND ART

JP2018-051646A discloses a technique in which components of a grinding apparatus are controlled in accordance with processing conditions stored in a condition storing section, thereby enabling same process results to be obtained. In the technique disclosed in JP2018-051646A, the load that is applied to a workpiece, or the load current of a spindle motor is compared with a reference value, and, when the difference becomes large, the processing conditions are adjusted to optimize the processing conditions.

In the technique disclosed in JP2018-051646A, it is not easy to identify the cause of a phenomenon where the difference between the load that is applied to the workpiece, or the load current of the spindle motor and the reference value becomes large. Therefore, it is difficult to determine which one of a plurality of controllable components is should be adjusted in order to optimize the processing conditions.

SUMMARY OF INVENTION

The present disclosure provides an apparatus and method that are used for assisting a grinding machine, and that assist to optimize processing conditions (hereinafter, such an apparatus and method for assisting a grinding machine are referred to as "assistance apparatus" and "assistance method," respectively).

(1. First Assistance Apparatus for Assisting Grinding Machine)

According to an aspect of the present disclosure, an first assistance apparatus for assisting at least one grinding machine including a controller includes a status information acquiring section that acquires a grinding condition as a status information, the grinding condition including set states associated with a plurality of movement command data that are controllable with the controller of the grinding machine, an evaluation result acquiring section that acquires evaluation results of a plurality of evaluation objects that are obtained under the grinding condition, the evaluation objects being predetermined, a reward calculating section that calculates a reward for the status information based on the evaluation results, a policy storing section that stores a policy which is obtained from a value function, the value function being produced in a reinforcement learning that is based on the status information and the reward, the policy being configured to adjust the movement command data which corresponds to the status information such that the evaluation results are optimum, an action determining section that determines the movement command data to be adjusted and an adjustment amount at which said movement command data is adjusted, from among candidates of the plurality of movement command data that are adjustable, based on the status information and the policy, and an action information outputting section that is configured to output contents determined by the action determining section to the controller, the contents including an action information. The evaluation objects includes at least one of a grinding quality of a workpiece on which a grinding process is performed by the grinding machine, a surface condition or a wear amount of a grinding wheel after the grinding process, and a process time that is required to perform the grinding process of the workpiece.

Based on the policy obtained from the value function that is produced in the reinforcement learning, the assistance apparatus for assisting a grinding machine determines an action according to the status information (i.e., determines movement command data to be adjusted, and an adjustment amount of the movement command data). Moreover, the assistance apparatus outputs action information according to the determined action to the controller, thereby assisting setting of the grinding conditions for the grinding process in the grinding machine.

In a grinding process using a grinding machine, particularly, a process that is more accurate than a cutting process and the like is requested. In a grinding process using a grinding machine, on the other hand, a grinding wheel is worn as the grinding process advances, and the diameter of the grinding wheel is changed. During a period when the grinding conditions are changed from moment to moment in this way, it is not easy to adjust the movement command data so that a high evaluation result is attained for each of a plurality of evaluation objects.

By contrast, the assistance apparatus outputs the action information relating to an action that is determined in accordance with the status information, to the controller, and the grinding machine adjusts the movement command data based on the action information that is output from the assistance apparatus. Therefore, the grinding machine can perform a grinding process in a state where the grinding conditions are optimized, with the result that it is possible to obtain an optimum evaluation result.

(2. Second Assistance Apparatus for Assisting Grinding Machine)

According to another aspect of the present disclosure, an second assistance apparatus for assisting at least one grinding machine including a controller includes a status information acquiring section that acquires a grinding condition as a status information, the grinding condition including set states associated with a plurality of movement command data that are controllable with the controller of the grinding machine, an evaluation result acquiring section that acquires evaluation results of a plurality of evaluation objects that are obtained under the grinding condition, the evaluation objects being predetermined, a reward calculating section that calculates a reward for the status information based on the evaluation results, a value function storing section that stores a value function which is produced in a reinforcement learning that is based on the status information and the reward, a policy storing section that stores a policy which is obtained from the value function, the policy being configured to adjust the movement command data which corresponds to the status information such that the evaluation results are optimum, an action determining section that determines the movement command data to be adjusted and an adjustment amount at which said movement command data is adjusted, from among candidates of the plurality of movement command data that are adjustable, based on the status information and the policy, an action information outputting section that is configured to output contents determined by the action determining section to the controller, the contents including an action information, a value function updating section that is configured to update the value function stored in the value function storing section, based on an adjusted status information that is obtained by adjusting the status information based on the action information, and the reward for the adjusted status information, and a policy updating section that updates the policy based on the updated value function. The evaluation objects includes at least one of a grinding quality of a workpiece on which a grinding process is performed by the grinding machine, a surface condition of the grinding wheel after the grinding process, and a process time that is required to perform the grinding process of the workpiece.

The assistance apparatus for assisting a grinding machine performs reinforcement learning in which grinding conditions including set states of a plurality of movement command data are set as the status information, and movement command data to be adjusted, and the adjustment amount of the movement command data is set as the action information. While performing reinforcement learning based on the status information and the reward for the status information, then, the assistance apparatus updates the value function and policy for determining the action information, whereby the policy can be improved.

Based on the policy obtained from the value function that is produced in reinforcement learning, the assistance apparatus determines an action according to the status information, and outputs action information according to the determined action to the controller, thereby assisting setting of the grinding conditions for the grinding process in the grinding machine. The grinding machine adjusts the movement command data based on the action information that is output from the assistance apparatus, thereby enabling a grinding process to be performed in a state where the grinding conditions are optimized. As a result, the grinding machine can obtain an optimum evaluation result.

(3. Assistance Method for Assisting Grinding Machine)

According to another aspect of the present disclosure, an assistance method for assisting a grinding machine, using the second assistance apparatus for assisting the grinding machine includes, as a first learning, calculating the reward while using the estimated evaluation result as the evaluation result, the estimated evaluation result being estimated by the evaluation result estimating section, and, as the first learning, updating the value function stored in the value function storing section, and subsequently updating the policy based on the updated value function. And the assistance method further includes, as a second learning, calculating the reward based on the evaluation result that is obtained when a grinding process is actually performed, and, as the second learning, updating the value function stored in the value function storing section.

In the assistance method for assisting a grinding machine, in the first learning step, the reward is calculated while using the estimated evaluation result that is estimated by the evaluation result estimating section, as the evaluation result, and therefore the assistance apparatus can perform reinforcement learning without actually performing a grinding process. In the assistance apparatus, therefore, it is possible to, in the first learning step, avoid generation of a cost caused by occurrence of a defective product or early wear of the grinding wheel, and the policy can be improved in a short period of time. In the assistance method for assisting a grinding machine, the reward is calculated in the second learning step, based on the evaluation result that is obtained when a grinding process is actually performed. That is, the assistance apparatus performs reinforcement learning based on the evaluation result that is obtained in an actual grinding process using the grinding machine, and therefore the policy can be further improved.

Figure 1:
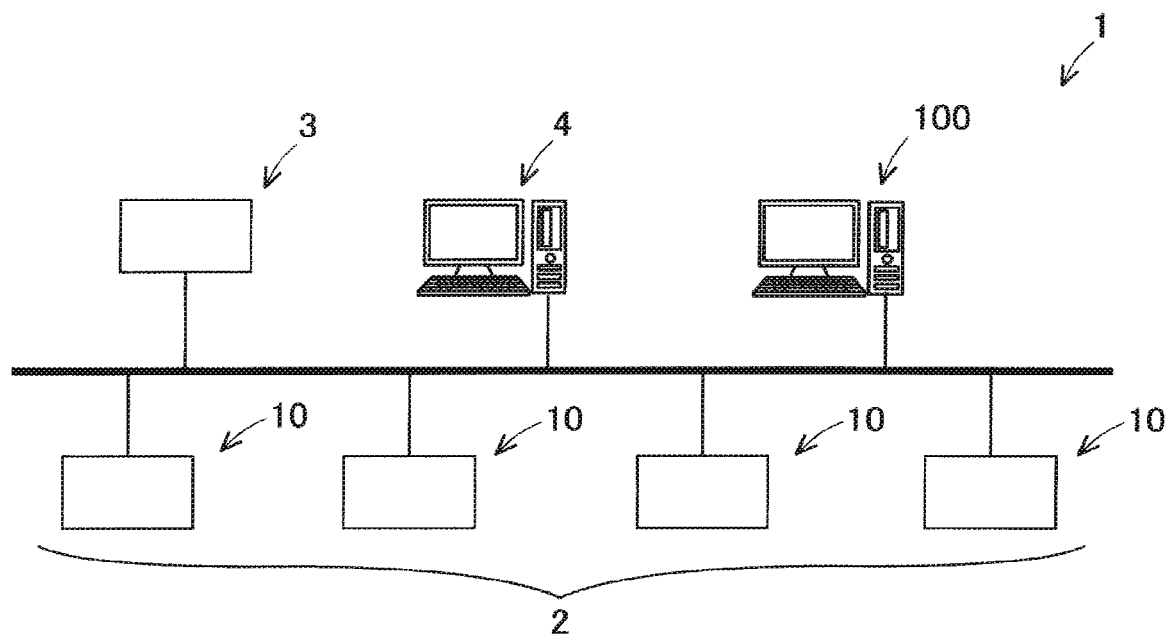
FIG. 1 is a view schematically showing the configuration of a grinding machine support system.

DESCRIPTION OF EMBODIMENTS (1. Summary of Grinding Machine Support System 1)

First, a grinding machine support system 1 will be summarily described with reference to FIG. 1. The grinding machine support system 1 includes a grinding machine line 2, an external apparatus 3, an estimation apparatus 4, and an assistance apparatus 100.

The grinding machine line 2 is configured by a plurality of grinding machines 10 for grinding a workpiece W. Grinding machines of various configurations, such as cylindrical grinding machines and cam grinding machines may be used as the grinding machines 10. The external apparatus 3 is used when the grinding quality of the workpiece W that is ground by the grinding machine 10, or the surface condition of a grinding wheel 16 (see FIG. 2) after a grinding process to be detected. The estimation apparatus 4 is used when the grinding quality of the workpiece W that is ground by the grinding machine 10, or the wear amount of the grinding wheel 16 after a grinding process is to be estimated. When the grinding quality of the workpiece W or the surface condition of the grinding wheel 16 is to be known, namely, the grinding machine support system 1 can acquire a result of detection that is performed by the external apparatus 3, and also that of estimation that is performed by the estimation apparatus 4.

The assistance apparatus 100 is disposed so as to be communicable with the grinding machines 10 constituting the grinding machine line 2, the external apparatus 3, and the estimation apparatus 4. Alternatively, the assistance apparatus 100 may be configured as an apparatus that is incorporated in one of the grinding machines 10. The assistance apparatus 100 performs assistance to maximize evaluation about each of a plurality of preset evaluation objects. Examples of the evaluation objects are the grinding quality of the workpiece W, the surface condition of the grinding wheel 16, and the like. In accordance with evaluation results of the evaluation objects, the assistance apparatus 100 adequately adjusts movement command data that can be controlled by a controller 20 of the grinding machine 10.

Specifically, a policy obtained from the value function that is produced in reinforcement learning is stored in the assistance apparatus 100. Based on the policy, then, the assistance apparatus 100 selects movement command data to be adjusted, from a plurality of candidates of movement command data that can be adjusted under the current grinding conditions, and determines the adjustment amount of the selected movement command data. Therefore, the grinding machine support system 1 can optimize the grinding conditions of each of the grinding machines 10.

(2. Configuration of Grinding Machine 10)

Figure 2:
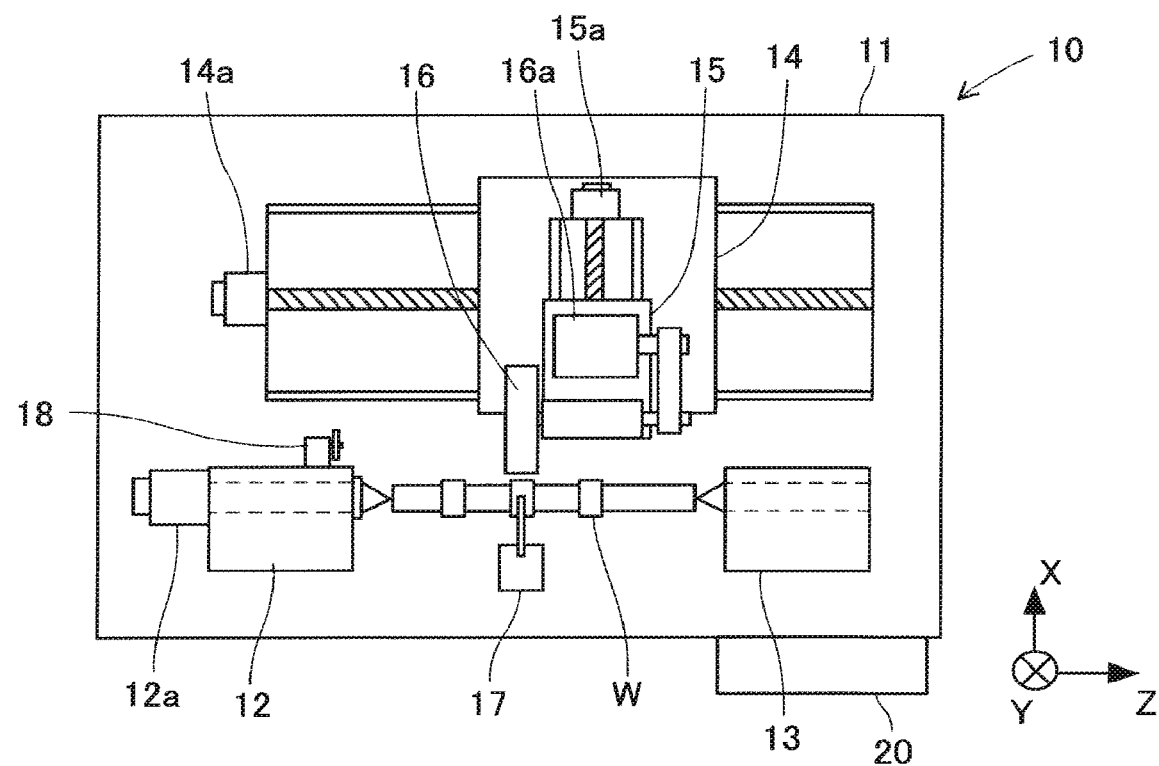
FIG. 2 is a plan view of a grinding machine.

Next, the configuration of each of the grinding machines 10 will be described with reference to FIGS. 2 and 3. In the embodiment, a case where the grinding machine 10 is a cylindrical grinding machine of the grinding head traverse type will be exemplarily described. In the grinding machine support system 1, alternatively, a grinding machine of the table traverse type may be used as the grinding machine 10. The grinding machine 10 mainly includes a bed 11, a headstock 12, a tailstock 13, a traverse base 14, a grinding head 15, a grinding wheel 16, a sizing device 17, a grinding wheel correction device 18, and a controller 20.

The bed 11 is fixed to the installation surface. The headstock 12 is disposed on the upper surface of the bed 11, and supports the workpiece W so that the workpiece is rotatable about the center axis (about the Z-axis) of the workpiece W. The tailstock 13 is disposed at a position that is in the upper surface of the bed 11, and that is opposed to the headstock 12. The headstock 12 and the tailstock 13 rotatably support the both ends of the workpiece W. The workpiece W is rotated by driving of a motor 12a that is disposed in the headstock 12.

The traverse base 14 is disposed on the upper surface of the bed 11 so as to be movable in the direction of the central axis (the direction of the Z-axis) of the workpiece W. The traverse base 14 is moved by driving of a motor 14a that is disposed in the bed 11. The grinding head 15 is disposed on the upper surface of the traverse base 14 so as to be movable in the direction (the X-axis direction) in which the grinding head approaches and separates from the workpiece W. The grinding head 15 is moved by driving of a motor 15a that is disposed in the traverse base 14.

The grinding wheel 16 is formed into a disk-like shape, and rotatably supported by the grinding head 15. The grinding wheel 16 is moved by driving of a motor 16a that is disposed in the grinding head 15. The grinding wheel 16 is configured by fixing together a plurality of abrasive grains with a bonding material. Among the kinds of abrasive grains, there are general abrasive and super abrasive. As the general abrasive, ceramic materials such as alumina and silicon carbide are well known. The super abrasive is diamonds or CBN. The sizing device 17 is disposed on the upper surface of the bed 11, includes a pair of probes that can be contacted with the outer circumferential surface of the workpiece W, and measures dimensions (diameter) of a processed portion of the workpiece W.

The grinding wheel correction device 18 corrects the surface condition of the grinding wheel 16. The grinding wheel correction device 18 performs at least one of truing and dressing to correct the grinding wheel 16. Moreover, the grinding wheel correction device 18 has also a function of measuring dimensions (diameter) of the grinding wheel 16.

Here, truing is a reshaping work such as a work of, in the case where the grinding wheel 16 is worn by grinding, shaping the grinding wheel 16 in accordance with the shape of the workpiece W, or that of eliminating deflection of the grinding wheel 16 caused by uneven wear. Dressing is a dressing work such as a work of adjusting the projection amount of abrasive grains, or that of creating cutting edges of abrasive grains. Dressing is a work of correcting glazing, loading, edge breaking, and the like, and usually performed after truing. Truing and dressing are sometimes performed without being particularly distinguished from each other.

Figure 3:
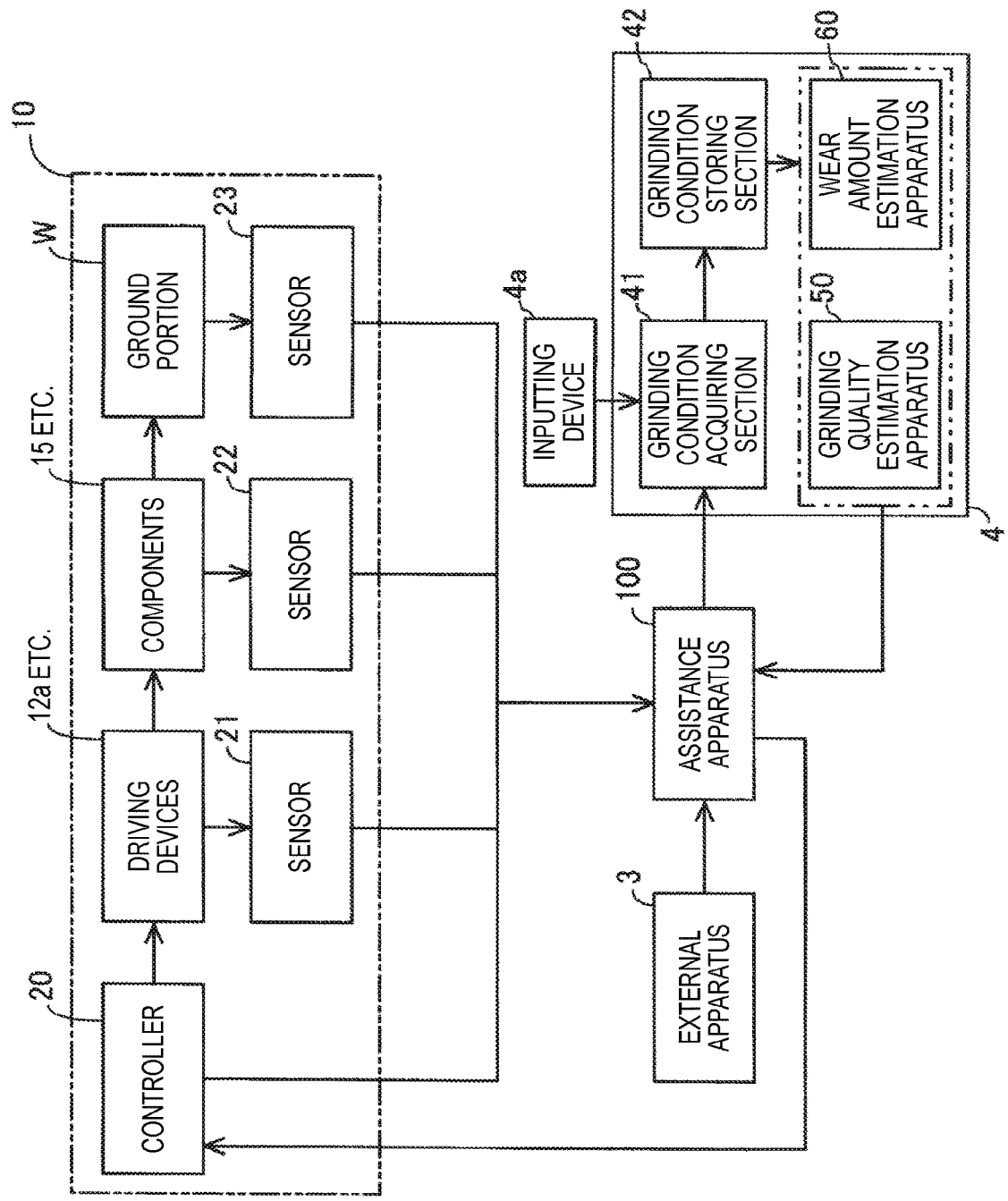
FIG. 3 is a functional block diagram showing the configuration of the grinding machine support system.

As shown in FIG. 3, the controller 20 controls driving devices based on an NC program and a PLC control program. The NC program is produced based on movement command data that will be described later, and the controller 20 controls driving devices 12a, 14a, 15a, 16a, 17, 18 (identified as "12a ETC." in FIG. 3) based on the NC program. The PLC control program operates output apparatuses in accordance with ON/OFF of a command signal of an input apparatus.

For example, the controller 20 controls the grinding process based on the diameter of the workpiece W that is measured by the sizing device 17, until the workpiece W has the finish shape. In the case where replacement or correction (truing and dressing) of the grinding wheel 16 is to be performed, the controller 20 controls the motors 14a, 15a, 16a, the grinding wheel correction device 18, and the like. In FIG. 3, a portion of the workpiece W that is to be ground by the grinding wheel 16 is indicated by ground portion.

The grinding machine 10 further includes: sensors 21 that detect actual movement data of the driving devices 12a and the like; sensors 22 that detect the states of the components 15 and the like (data indicating the states of the components 15 and the like); and sensors 23 that detect data of the ground portion W (ground portion data) that are changed in accordance with the grinding process. For example, the sensors 21 are configured by a current sensor that detects the driving current of the motor 12a, a position sensor that detects the current position (rotation angle) of the motor 12a, and the like. The sensors 21 detect similar information also with respect to the other driving devices 14a, 15a, 16a, 17, 18. The sensors 22 are configured by: vibration sensors that detect vibrations of the components 15 and the like; distortion sensors that detect deformation amounts of the components 15 and the like; temperature sensors that detect the temperatures of the components 15 and the like, and the air temperature of the place where the grinding machine 10 is placed; etc. A sensor that detects the acceleration due to vibration, and a sensor that detects a sound wave corresponding to vibration, and the like can be used as the vibration sensors. The sensors 23 are configured by the sizing device 17 that detects the dimension (diameter) of the workpiece W that is changed in accordance with the grinding process, a temperature sensor that detects the temperature of the ground point during the grinding process, etc.

(3. Examples of External Apparatus 3)

Next, examples of the external apparatus 3 will be described. In the grinding machine support system 1 of the embodiment, as the external apparatus 3, a grinding quality detection apparatus is disposed that, for each of workpieces W that are grounded by the grinding wheel 16 of the grinding machine 10, detects grinding quality data of the workpiece W.

The grinding quality data include, for example, affected layer data (data of grinding burn and the like), surface texture data (data of the surface roughness and the like), chatter pattern data, and other data. That is, the external apparatus 3 is configured by: an affected layer detector that detects affected layer data (data relating to grinding burn, a softened layer due to grinding, and the like); a surface texture measurement device that acquires surface texture data (data relating to the surface roughness and the like); a chatter detector that acquires chatter pattern data; etc. Alternatively, the external apparatus 3 may be configured by a device that directly acquires these data, or by a device that acquires other data correlated with these data, and that performs a calculation by using the other data to acquire the target data, i.e., a device that indirectly acquires the target data.

The affected layer data may be data indicating the existence or absence of an affected layer, or a score relating to the degree of an affected layer. The surface texture data may be, for example, the value itself of the surface roughness, or a score relating to the degree of the surface roughness. The chatter pattern data may be data indicating the existence or absence of a chatter pattern, or a score relating to the degree of a chatter pattern. Each of the scores may be indicated, for example, by one of a plurality of grades.

The grinding machine support system 1 may acquire grinding quality data of the workpiece W that are detected by the grinding quality detection apparatus, as surface condition data corresponding to the surface condition of the grinding wheel 16. As the external apparatus 3, the grinding machine support system 1 may dispose an external apparatus 3 (for example, an apparatus for detecting the surface condition of the grinding wheel 16) other than the above-described grinding quality detection apparatus.

(4. Examples of Estimation Apparatus 4)

Next, the estimation apparatus 4 will be described. About a preset evaluation object relating to the grinding process, the estimation apparatus 4 estimates the evaluation result of the evaluation object in the case where the grinding machine 10 grinds the workpiece W under predetermined grinding conditions. For example, the estimation apparatus 4 includes a grinding quality estimation apparatus 50 that estimates the grinding quality of the workpiece W, and a wear amount estimation apparatus 60 that estimates the wear amount of the grinding wheel 16. The estimation apparatus 4 may be configured as an apparatus that is incorporated in the grinding machine 10, or as a unit that is separated from the grinding machine 10.

The estimation apparatus 4 also functions as a simulation apparatus for a grinding process. For example, the estimation apparatus 4 includes an inputting device 4a that receives an input by the user of the grinding machine support system 1, and a grinding condition acquiring section 41 that acquires the contents of the input to the inputting device 4a, and information (action information) which is output from the assistance apparatus 100. The estimation apparatus 4 further includes a grinding condition storing section 42 that stores virtual grinding conditions which is set based on the input contents and information which are acquired by the grinding condition acquiring section 41.

The estimation apparatus 4 may perform a simulation of the grinding process based on the virtual grinding conditions that are stored in the grinding condition storing section 42, and estimate the evaluation result of the evaluation object in the case where the grinding machine 10 grinds the workpiece W under the grinding conditions. When the estimation apparatus 4 performs a simulation of the grinding process based on the virtual grinding conditions, namely, the estimation apparatus 4 can estimate the evaluation result of the evaluation object without actually conducting a grinding process performed by the grinding machine 10.

Moreover, the estimation apparatus 4 can estimate the evaluation result of the evaluation object based on the grinding condition data that are obtained in an actual grinding process performed by the grinding machine 10. In this case, the assistance apparatus 100 may acquire the estimation result obtained by the estimation apparatus 4 as the evaluation result, in place of the acquisition of the detection result obtained by the external apparatus 3 as the evaluation result.

(4-1. Grinding Quality Estimation Apparatus 50)

Figure 4:
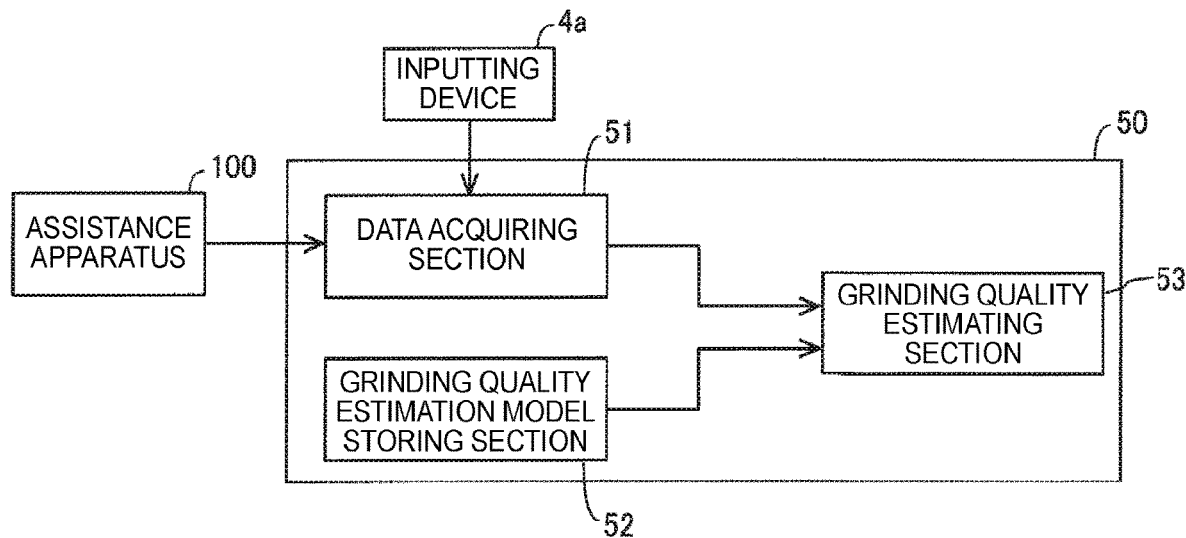
FIG. 4 is a functional block diagram showing the configuration of a grinding quality estimation apparatus.

As shown in FIG. 4, the grinding quality estimation apparatus 50 includes a data acquiring section 51, a grinding quality estimation model storing section 52, and a grinding quality estimating section 53. The data acquiring section 51 acquires the grinding condition data that are required in the estimation of the grinding quality of the workpiece W. Specifically, the data acquiring section 51 acquires movement command data as the grinding condition data. The movement command data include a command infeed speed for each step, command positions of the moving members 14, 15 at the step switching, a command rotation speed of the grinding wheel 16, a command rotation speed of the workpiece W, etc. The grinding process that is to be applied to the workpiece W by the grinding machine 10 is performed in a plurality of grinding steps of rough grinding, fine grinding, micro-grinding, spark out, and the like, and the grinding machine 10 switches steps based on the movement command data.

As the grinding condition data, the data acquiring section 51 acquires actual movement data of the driving devices 12a and the like that are controlled by the controller 20, from the sensors 21. Examples of the actual movement data that are detected by the sensors 21 are the driving currents of the motor 12a and the like, and the actual positions of the motor 12a and the like. The data acquiring section 51 further acquires, as the grinding condition data, actual measurement data that are obtained when the workpiece W is ground by the grinding wheel 16, from the sensors 22, 23. Examples of the actual measurement data that are detected by the sensors 22 are vibrations, deformation amounts, and temperatures of the components 15 and the like, and the ambient temperature of the place where the grinding machine 10 is placed. Examples of the actual measurement data that are detected by the sensors 23 are the dimension (outer diameter) of the workpiece W, and the temperature of the ground point. For each of the workpieces W, the data acquiring section 51 acquires actual movement data and actual measurement data during the period from the initial time of the grinding process to the final time of the grinding process.

In the case where the estimation apparatus 4 is to perform a simulation of the grinding process based on virtual grinding conditions, the data acquiring section 51 acquires the virtual grinding conditions that are stored in the grinding condition storing section 42. Namely, the grinding condition data contain the movement command data, the actual movement data, and the actual measurement data.

The grinding quality estimation model storing section 52 stores a grinding quality estimation model indicating relationships between the grinding condition data and the grinding quality of the workpiece W. The grinding quality estimation model is a learning model that is produced by using mechanical learning. The grinding quality estimation model estimates, as the grinding quality of the workpiece W, the state of an affected layer of the workpiece W, the surface texture of the workpiece W, and the state of a chatter pattern of the workpiece W. The grinding quality estimation model is not limited to estimate all of the above-described kinds of the grinding quality, but may estimate only a part of the above-described kinds of the grinding quality. The grinding quality estimating section 53 estimates the grinding quality of the workpiece W based on the grinding condition data that are acquired by the data acquiring section 51, and the grinding quality estimation model that is stored in the grinding quality estimation model storing section 52.

(4-2. Wear Amount Estimation Apparatus 60)

Figure 5:
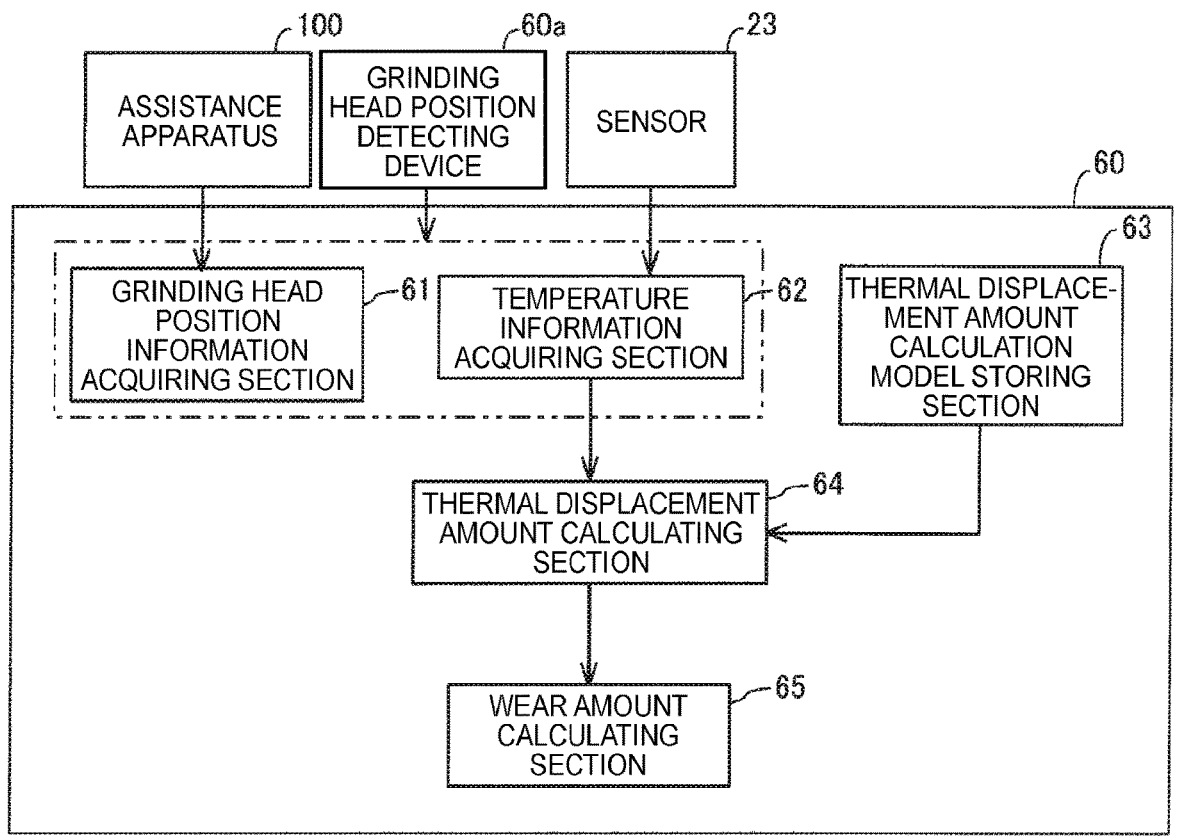
FIG. 5 is a functional block diagram showing the configuration of a wear amount estimation apparatus.

As shown in FIG. 5, the wear amount estimation apparatus 60 includes a grinding head position information acquiring section 61, a temperature information acquiring section 62, a thermal displacement amount calculation model storing section 63, a thermal displacement amount calculating section 64, and a wear amount calculating section 65.

The grinding head position information acquiring section 61 acquires information of the position of the grinding head 15 that is detected by a grinding head position detecting device 60a which is disposed in the grinding machine 10. The grinding head position detecting device 60a is a device for detecting the position of the grinding head 15 in the X-axis direction. Examples of the grinding head position detecting device 60a are an encoder attached to the motor 15a, and a linear scale attached to the traverse base 14. In the embodiment, as the position information, the grinding head position information acquiring section 61 acquires the information of the position of the grinding head 15 in the X-axis direction at the timing when the grinding process is completed.

The temperature information acquiring section 62 acquires, as temperature information, the temperatures of the components 15 and the like that are detected by the sensors 23, at a timing corresponding to the position information of the grinding head 15 that is detected by the grinding head position detecting device 60a. The sensors 23 detect at least the temperatures of the components 15 and the like that affect the variation of the axis-to-axis distance between the workpiece W and the grinding wheel 16. For example, the sensors 23 are attached to the bed 11, the traverse base 14, the grinding head 15, etc.

In the case where the estimation apparatus 4 is to perform a simulation of the grinding process based on the virtual grinding conditions, the grinding head position information acquiring section 61 and the temperature information acquiring section 62 acquire the virtual grinding conditions that are stored in the grinding condition storing section 42. Namely, the grinding condition data contain the position information of the grinding head 15 in the Z-axis direction at the timing when the grinding process is completed, and the temperatures of the components 15 and the like that affect the variation of the axis-to-axis distance between the workpiece W and the grinding wheel 16.

The thermal displacement amount calculation model storing section 63 stores a thermal displacement amount calculation model indicating the relationships between the temperatures of the components 15 and the like, and the thermal displacement amounts of the components 15 and the like. The thermal displacement amount calculation model is a learning model that is produced by using mechanical learning. The thermal displacement amount calculation model calculates a value that is obtained by subtracting the wear amount of the grinding wheel 16 which is calculated based on a regression equation indicating the relationship between the grinding number of the workpiece W and the position information, from the position information, as the thermal displacement amounts of the components 15 and the like. The thermal displacement amount calculation model is produced by supervised learning in which the thermal displacement amounts and the temperatures of the components 15 and the like are used as a learning data set.

The thermal displacement amount calculating section 64 calculates the thermal displacement amounts of the components 15 and the like, based on the temperatures of the components 15 and the like and the thermal displacement amount calculation model. Specifically, the thermal displacement amount calculating section 64 receives the temperatures of the components 15 and the like that are detected by the sensors 23, as input data, uses the thermal displacement amount calculation model, and then outputs the thermal displacement amounts. The thermal displacement amounts are thermal displacement amounts with respect to the state where no thermal displacement exists.

The wear amount calculating section 65 calculates the wear amount of the grinding wheel 16 based on the position information of the grinding head 15, and the thermal displacement amounts that are calculated by the thermal displacement amount calculating section 64. The wear amount of the grinding wheel 16 may be the wear amount of the grinding wheel 16 with respect to the timing when the immediately preceding grinding process of the workpiece W is completed, or that of the grinding wheel 16 with respect to the timing when the previous correction is performed.

Figure 6:
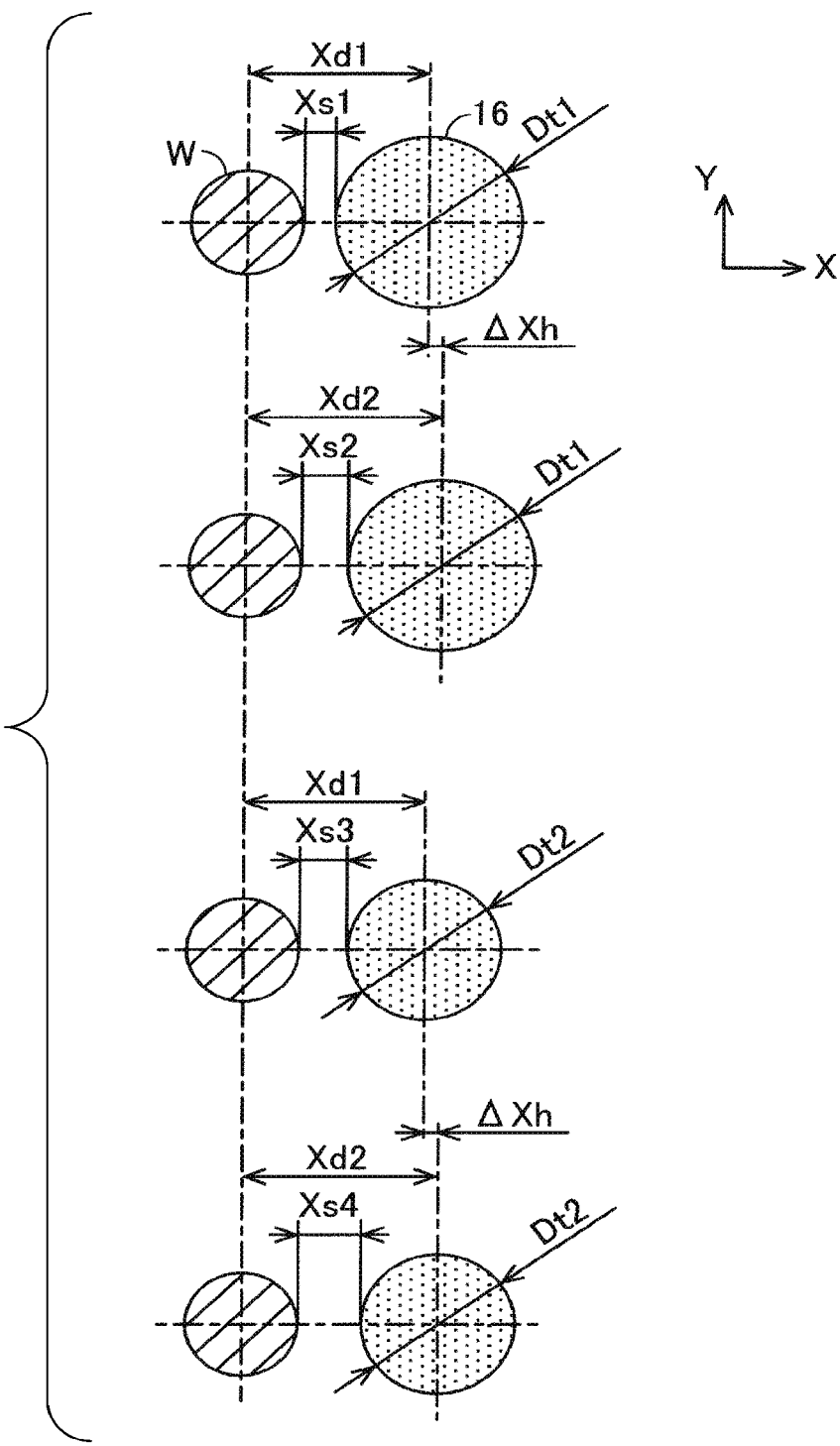
FIG. 6 is a view showing relative positions of a workpiece and a grinding wheel at a starting position of a rough grinding feeding movement.

Here, the relative position of the workpiece W and the grinding wheel 16 will be described with reference to FIG. 6. In the embodiment, a grinding feeding movement contains a rough grinding feeding movement for performing rough grinding, a fine grinding feeding movement for performing fine grinding, a micro-grinding feeding movement for performing micro-grinding, and a feed stopping movement for performing spark out. In FIG. 6, relative positions of the workpiece W and the grinding wheel 16 when the grinding wheel 16 is moved to the starting position of the rough grinding feeding movement for performing rough grinding are shown.

As shown in a first view from the top of FIG. 6, the axis-to-axis distance between the workpiece W and the grinding wheel 16 is Xd1. At this time, the outer diameter of the grinding wheel 16 is assumed to be Dt1. The outer diameter of the workpiece W is that of the raw material before grinding. The separation distance between the workpiece W and the grinding wheel 16 is Xs1.

It is assumed that, as shown in a second view from the top of FIG. 6, the axis-to-axis distance between the workpiece W and the grinding wheel 16 is caused to become Xd2, by thermal displacements of the components 15 and the like of the grinding machine 10, such as thermal displacements of the bed 11 and the grinding head 15. At this time, the thermal displacement amount is assumed to be ΔXh. Then, the separation distance between the workpiece W and the grinding wheel 16 is Xs2 that is larger than Xs1.

In a third view from the top of FIG. 6, the outer diameter of the workpiece W is reduced by wearing and truing of the grinding wheel 16 to be Dt2. The axis-to-axis distance between the workpiece W and the grinding wheel 16 is assumed to be Xd1 that is equal to that in the first view from the top of FIG. 6. At this time, the separation distance between the workpiece W and the grinding wheel 16 becomes Xs3 that is larger than Xs1.

It is assumed that, as shown in a fourth view from the top of FIG. 6, the axis-to-axis distance between the workpiece W and the grinding wheel 16 is Xd2 that is equal to that in the second view from the top of FIG. 6, by thermal displacements of the components 15 and the like of the grinding machine 10. At this time, the separation distance between the workpiece W and the grinding wheel 16 becomes Xs4 that is larger than Xs1, Xs2, and Xs3.

That is, the separation distance between the workpiece W and the grinding wheel 16 is changed by wearing and truing of the grinding wheel 16, and thermal displacements of the components 15 and the like of the grinding machine 10. As a result, even when the rough grinding feeding movement is started from a constant position, a time period extending from the start of the rough grinding feeding movement to a timing when the grinding wheel 16 is contacted with the workpiece W, and rough grinding is actually performed (hereinafter, the time period is referred to as "idle grinding time") is changed in accordance with the amounts of wearing and truing of the grinding wheel 16, and the thermal displacement amounts Xh of the components 15 and the like of the grinding machine 10.

In the example shown in the second view from the top of FIG. 6, by contrast, the thermal displacement amounts Xh are obtained, and the starting position of the rough grinding feeding movement is corrected by the degree corresponding to the thermal displacement amounts Xh, whereby the separation distance between the workpiece W and the grinding wheel 16 is made to be Xs1 that is equal to that in the first view from the top of FIG. 6. In the example shown in the third view from the top of FIG. 6, the changing amount (Dt1−Dt2) of the outer diameter of the grinding wheel 16 is obtained, and the starting position of the grinding feeding movement is corrected by the degree corresponding to the changing amount (Dt1−Dt2) of the outer diameter, whereby the separation distance between the workpiece W and the grinding wheel 16 is made to be Xs1 that is equal to that in the first view from the top of FIG. 6. At this time, the axis-to-axis distance between the workpiece W and the grinding wheel 16 is Xd3.

In the example shown in the fourth view from the top of FIG. 6, similarly, the thermal displacement amounts Xh and the changing amount (Dt1−Dt2) of the outer diameter of the grinding wheel 16 are obtained, and the starting position of the rough grinding feeding movement is corrected by (Xh+(Dt1−Dt2)), whereby the separation distance between the workpiece W and the grinding wheel 16 is made to be Xs1 that is equal to that in the first view from the top of FIG. 6. At this time, the axis-to-axis distance between the workpiece W and the grinding wheel 16 is Xd3.

As described above, the grinding machine 10 obtains the thermal displacement amounts Xh and the outer diameters Dt1, Dt2 of the grinding wheel 16, and corrects the starting position of the rough grinding feeding movement, whereby the separation distance between the workpiece W and the grinding wheel 16 is made constant. Therefore, the grinding machine 10 can shorten the idle grinding time, with the result that the grinding cycle time can be shortened. Moreover, the grinding machine support system 1 estimates the wear amount or surface condition of the grinding wheel 16 based on the wear amount of the grinding wheel 16 that is calculated by the wear amount calculating section 65 in the case where the starting position of the rough grinding feeding movement is corrected.

(5. Configuration of Assistance Apparatus 100 that Functions in Learning Phase)

Figure 7:
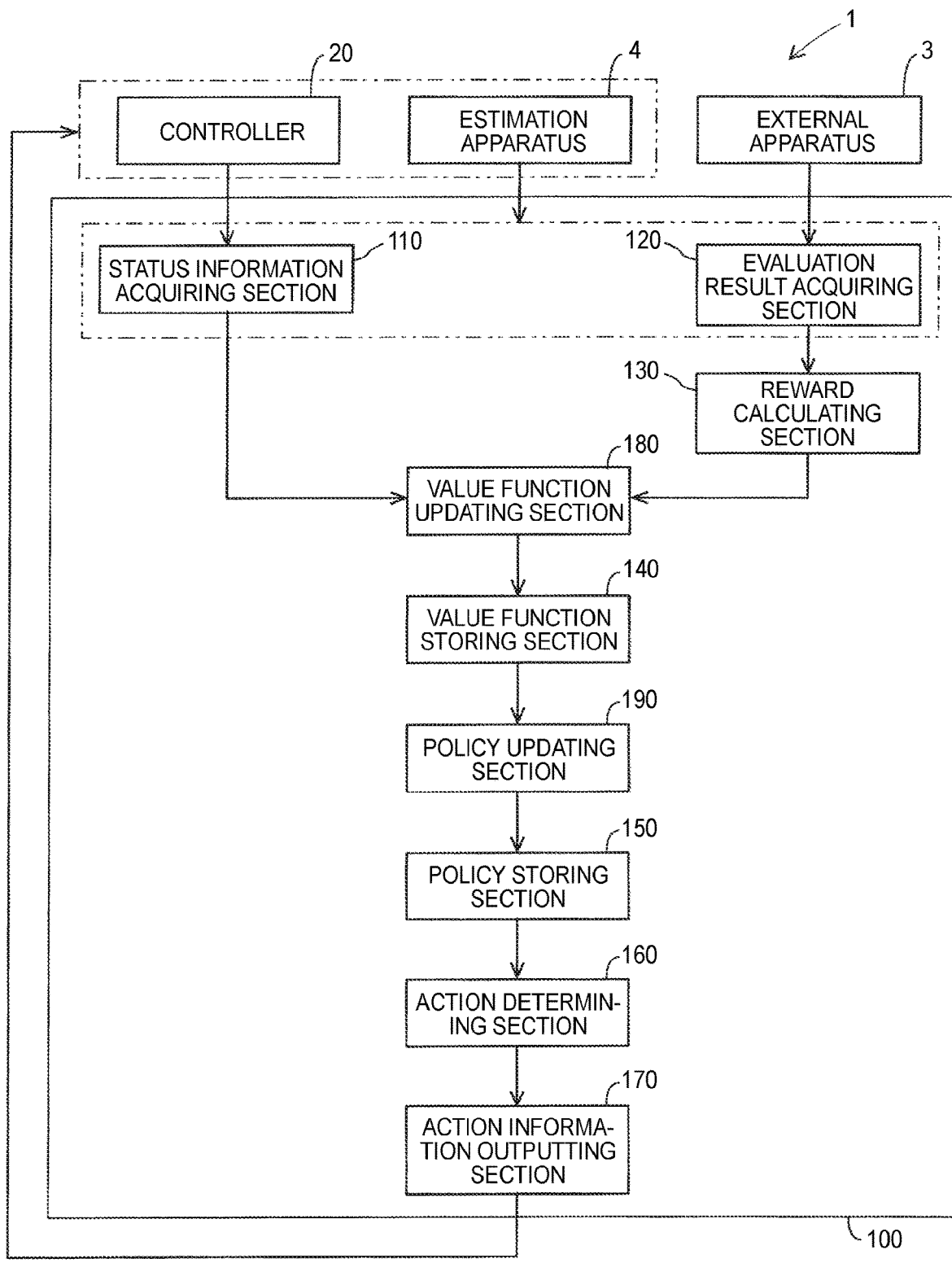
FIG. 7 is a functional block diagram showing the configuration of a learning phase of the assistance apparatus.

Next, the configuration of the assistance apparatus 100 that functions in a learning phase will be described with reference to FIG. 7. As the configuration that functions in the learning phase, as shown in FIG. 7, the assistance apparatus 100 has the following configuration. That is, the assistance apparatus 100 mainly includes a status information acquiring section 110, an evaluation result acquiring section 120, a reward calculating section 130, a value function storing section 140, a policy storing section 150, an action determining section 160, an action information outputting section 170, a value function updating section 180, and a policy updating section 190.

The assistance apparatus 100 as illustrated in FIG. 1 includes at least one processor and at least one memory. And, the status information acquiring section 110, the evaluation result acquiring section 120, the reward calculating section 130, the value function storing section 140, the policy storing section 150, the action determining section 160, the action information outputting section 170, the value function updating section 180, and the policy updating section 190 are included in either of the processor or the memory.

As illustrated in FIG. 1, the assistance apparatus 100 may be a device which is communicable with a kind of computer network formed in the grinding machines 10 constituting the grinding machine line 2, the external apparatus 3, and the estimation apparatus 4. For example, the assistance apparatus 100 may be a computer which is well-known for a person in the skilled art, or another computer. That is, the assistance apparatus 100 is not limited in the configuration as illustrated in FIG. 1.

The status information acquiring section 110 acquires grinding conditions including set states of a plurality of movement command data that can be controlled by the controller 20, as status information. For example, the status information acquiring section 110 acquires, as the status information, the ratio of the rotation speeds of the grinding wheel 16 and the workpiece W, the cutting amount of the grinding wheel 16, the feeding speed of the grinding wheel 16, ratios of the time distribution, process amount, and the like of rough grinding, fine grinding, and micro-grinding, the number of revolutions of the grinding wheel 16 in spark out, the temperatures of the components 15 and the like, the air temperature of the place where the grinding machine 10 is placed, etc.

The evaluation result acquiring section 120 acquires, about a preset evaluation object, the evaluation result of the evaluation object that is obtained under predetermined grinding conditions. For example, the evaluation result acquiring section 120 acquires, as evaluation results, the grinding quality of the workpiece W after the grinding process, the surface condition or wear amount of the grinding wheel 16 after the grinding process, the process time that is necessary for processing of the workpiece W, the power consumption of the grinding machine 10, the processing load that is applied to the workpiece W, the rate of operation of each of grinding machines 10 in the grinding machine line 2, etc. The evaluation result acquiring section 120 can acquire the evaluation result of the evaluation object from the various sensors and the like that are disposed in the grinding machine 10, the external apparatus 3, and the estimation apparatus 4.

The evaluation result acquiring section 120 can further acquire results of estimated evaluations that are performed by the grinding quality estimation apparatus 50 and wear amount estimation apparatus 60 which are disposed in the estimation apparatus 4, as evaluation results. Namely, the evaluation result acquiring section 120 can acquire both results of estimated evaluations that are estimated by the grinding quality estimation apparatus 50 and the wear amount estimation apparatus 60, and evaluation results that are obtained when a grinding process is actually performed by using the grinding machine 10.

The reward calculating section 130 calculates a reward for the status information (grinding conditions) based on the evaluation result of the evaluation object that is obtained under predetermined grinding conditions. In the case where the evaluation result is good, the reward calculating section 130 provides a plus reward to the status information, and, in the case where the evaluation result is not good, provides a minus reward (penalty) to the status information.

In the case where the grinding quality of the workpiece W that is one of evaluation results is equal to or higher than a preset reference, for example, the reward calculating section 130 provides a plus reward. In the case where the grinding quality is lower than the reference, by contrast, the reward calculating section 130 provides a minus reward. In the case where, with respect to the surface condition or wear amount of the grinding wheel 16 that is one of evaluation results, the surface condition is equal to or higher than a preset reference, or, in the case where the wear amount of the grinding wheel 16 is equal to or lower than a preset reference, the reward calculating section 130 provides a plus reward. In the case where the surface condition is lower than the reference, or in the case where the wear amount of the grinding wheel 16 is higher than the reference, the reward calculating section 130 provides a minus reward.

In the case where the process time that is one of evaluation results is equal to or lower than a set reference, similarly, the reward calculating section 130 provides a plus reward, and, in the case where the process time exceeds the reference, provides a minus reward. In the case where the rate of operation of the grinding machine 10 that is one of evaluation results is equal to or higher than a preset reference, the reward calculating section 130 provides a plus reward, and, in the case where the rate of operation is lower than the reference, provides a minus reward.

In the case where the power consumption of the grinding machine 10 that is one of evaluation results is equal to or lower than a preset reference, the reward calculating section 130 provides a plus reward, and, in the case where the power consumption is higher than the reference, provides a minus reward. In the case where the processing load that is one of evaluation results is equal to or lower than a preset reference, the reward calculating section 130 provides a plus reward, and, in the case where the processing load is higher than the preset reference, provides a minus reward.

As described above, the reward calculating section 130 calculates a reward for each of evaluation objects. Moreover, the reward calculating section 130 provides a reward corresponding to the difference between the reference that is set for each of evaluation objects, and the evaluation result. In the case where the difference between the evaluation result and the reference is large in the plus direction, a reward that is larger than that in the case where the difference between the evaluation result and the reference is small in the plus direction is provided. In the case where the difference between the evaluation result and the reference is large in the minus direction, similarly, a penalty that is larger than that in the case where the difference between the evaluation result and the reference is small in the minus direction is provided.

The value function storing section 140 stores a value function that is produced in reinforcement learning which is based on the status information acquired by the grinding machine 10, and the reward that is calculated by the reward calculating section 130. The value function is a function that is produced in order to obtain a policy relating to adjustment of the movement command data which corresponds to the status information so that the evaluation result of the evaluation object is optimum. A value function is produced by a reinforcement learning algorithm such as Q-learning, Sarsa, or the Monte Carlo method.

The policy storing section 150 stores a policy that is obtained from the value function stored in the value function storing section 140. The policy functions as a reference for selecting movement command data to be adjusted, from a plurality of adjustable movement command data, and determining an adjustment amount of the selected movement command data.

The action determining section 160 selects movement command data to be adjusted, based on the status information and the policy, and determines an adjustment amount of the selected movement command data. In accordance with the policy and the reinforcement learning algorithm, at this time, the action determining section 160 selects movement command data while mixing selection (use) that is based on the value function, with selection (search) that is not based on the value function.

The action information outputting section 170 outputs the contents of the determination performed by the action determining section 160, as action information to the controller 20 of the grinding machine 10. Then, the controller 20 adjusts the movement command data based on the action information that is acquired from the action information outputting section 170, and the grinding machine 10 performs a grinding process on a new workpiece W under new grinding conditions (adjusted status information) that are adjusted based on the action information. Thereafter, the status information acquiring section 110 acquires adjusted new grinding conditions as new status information, and the evaluation result acquiring section 120 acquires the evaluation result of the evaluation object that is obtained under the new grinding conditions. Then, the reward calculating section 130 calculates a reward for the new status information (adjusted status information), based on the evaluation result that is obtained under the new grinding conditions.

Alternatively, the action information outputting section 170 may output the action information to the estimation apparatus 4. In the alternative, the grinding condition acquiring section 41 of the estimation apparatus 4 acquires the action information, and updates the virtual grinding conditions stored in the grinding condition storing section 42. Then, the estimation apparatus 4 performs a simulation of a grinding process based on the new updated virtual grinding conditions, and estimates the evaluation result of the evaluation object in the case where the grinding machine 10 grinds the workpiece W under the grinding conditions.

Thereafter, the status information acquiring section 110 acquires the virtual grinding conditions stored in the grinding condition acquiring section 41, as new status information, and the evaluation result acquiring section 120 acquires the estimated evaluation result of the evaluation object that is obtained by the estimation apparatus 4. Then, the reward calculating section 130 calculates a reward for the new status information based on the estimated evaluation result that is obtained by the estimation apparatus 4. Namely, the reward calculating section 130 calculates an evaluation of the action information in which the state transits from the not-yet-adjusted status information to the adjusted status information, as a reward for the adjusted status information (new status information).

The value function updating section 180 updates the value function stored in the value function storing section 140, based on the new status information (adjusted status information) that is adjusted based on the action information, and the reward for the new status information (adjusted status information). The value function updating section 180 is requested only to update the value function based on the reinforcement learning algorithm, and, in the case where a minus reward is provided, may not update the value function. The policy updating section 190 updates the policy stored in the policy storing section 150, based on the updated value function.

(6. Learning Step)

A learning step that is performed by the grinding machine support system 1 in the learning phase will be described with reference to the flowchart shown in FIG. 8.

Figure 8:
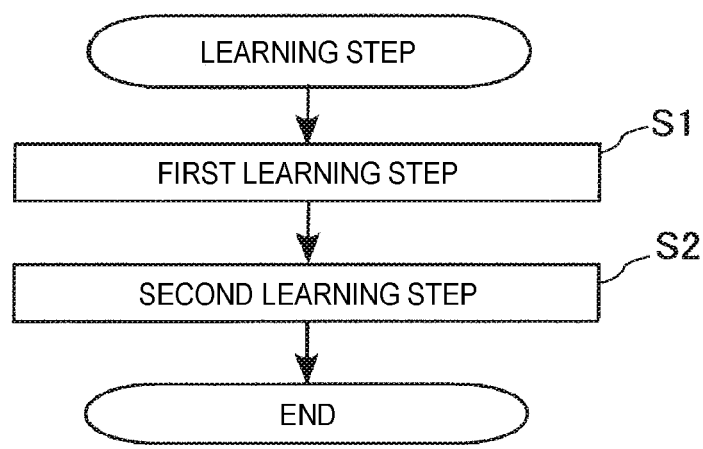
FIG. 8 is a flowchart showing a learning step that is executed by the grinding machine support system.

As shown in FIG. 8, the grinding machine support system 1 executes a first learning step (S1) in which the reinforcement learning is performed by using the estimated evaluation result that is obtained by the estimation apparatus 4, as the first step in the learning step. Thereafter, the grinding machine support system 1 executes a second learning step (S2) in which the reinforcement learning is performed by using the actual evaluation result that is obtained after the actual grinding process conducted by the grinding machine 10.

In regard to this point, when the reinforcement learning is to be performed by the assistance apparatus 100, a temporary value function that is produced by the user of the assistance apparatus 100 is stored in the value function storing section 140, and a temporary policy that is produced by the user is stored in the policy storing section 150. The initial grinding conditions are temporarily set by the user.

Namely, the value function that is stored in the value function storing section 140 in the initial stage of the learning phase has ample room to improve, and the policy that is obtained from the value function is immature. In the case where the grinding machine 10 performs a grinding process under new grinding conditions that are adjusted based on an immature policy, therefore, the possibility that the evaluation result of the evaluation object is not good is high. As a result, there is a fear that the cost is increased by occurrence of a defective product or early wear of the grinding wheel 16.

In the initial stage of the learning step, therefore, the assistance apparatus 100 performs reinforcement learning by using the estimated evaluation result that is obtained by the estimation apparatus 4. In this case, the assistance apparatus 100 can perform reinforcement learning without actually conducting a grinding process, and therefore a cost caused by occurrence of a defective product or early wear of the grinding wheel 16 can be prevented from occurring. As compared with a case where reinforcement learning is performed while actually conducting a grinding process, moreover, the assistance apparatus 100 can obtain an evaluation result of the evaluation object in a shorter period of time, and therefore the value function and the policy can be updated within a short period of time.

In a stage where the policy is improved, thereafter, the assistance apparatus 100 performs reinforcement learning by using the actual evaluation result that is obtained after the grinding machine 10 actually conducts a grinding process. In the assistance apparatus 100, therefore, the policy can be further improved while suppressing occurrences of a defective product and early wear of the grinding wheel 16.

(6-1. First Learning Step)

Next, the first learning step (S1) that is executed in the learning step will be described with reference to the flowchart shown in FIG. 9.

Figure 9:
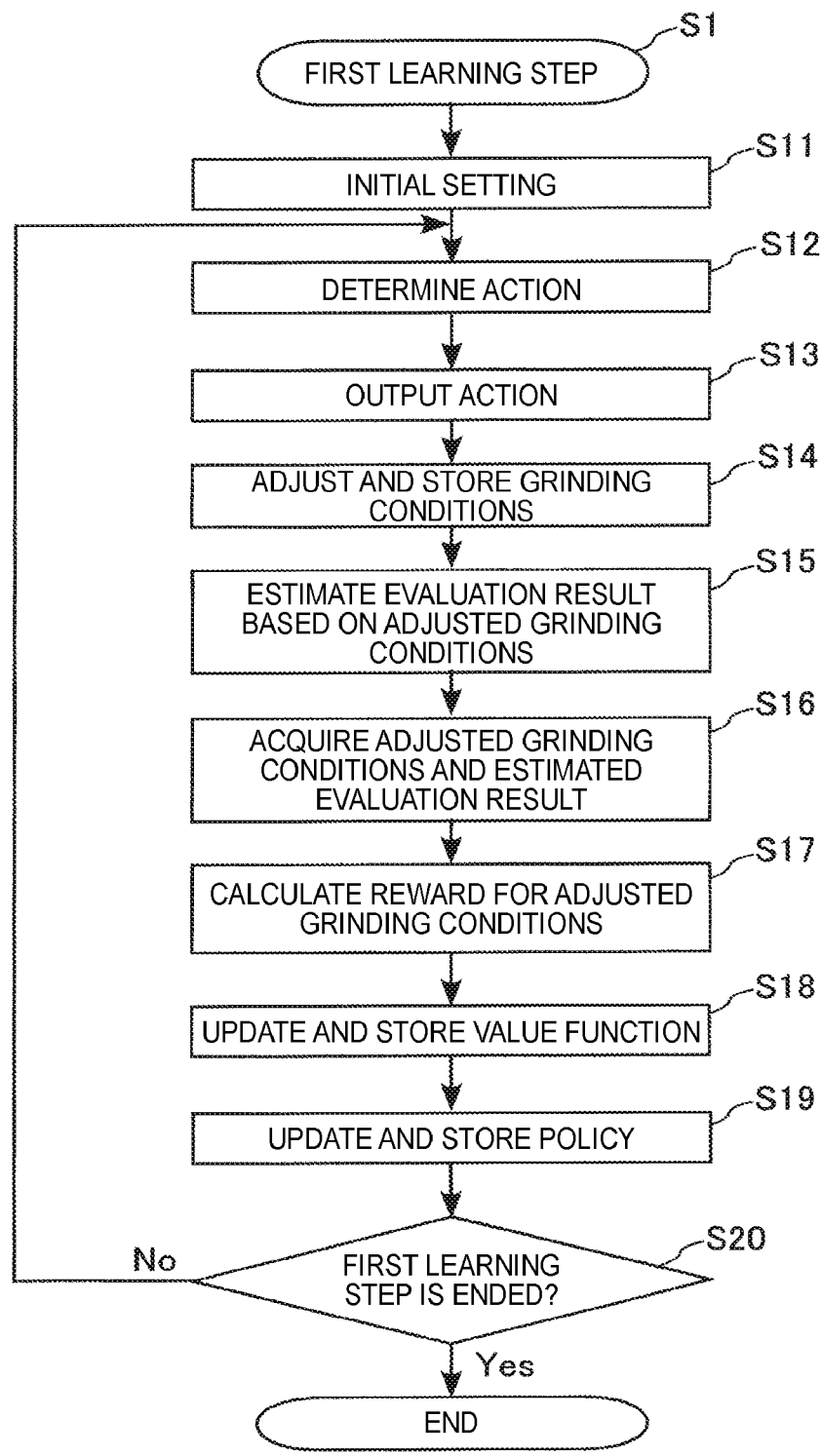
FIG. 9 is a flowchart showing a first learning step that is executed in the learning step.

As shown in FIG. 9, the assistance apparatus 100 performs initial setting (S11) as a first step that is executed in the first learning step (S1). In the step S11, the user of the assistance apparatus 100 causes the temporary value function and policy that are produced by the user, to be stored in the value function storing section 140 and the policy storing section 150, respectively. The grinding condition acquiring section 41 acquires temporary grinding conditions that are input by the user by using the inputting device 4a of the estimation apparatus 4, and causes the grinding conditions to be stored in the grinding condition storing section 42.

After the step S11, the action determining section 160 selects movement command data to be adjusted, from a plurality of candidates of the movement command data that can be adjusted, and determines the adjustment amount of the selected movement command data (S12) Thereafter, the action information outputting section 170 outputs the action information to the estimation apparatus 4 based on the contents of the determination conducted by the action determining section 160 (S13).

After the step S13, the estimation apparatus 4 adjusts the grinding conditions based on the action information that is acquired from the action information outputting section 170 by the grinding condition acquiring section 41, and causes the adjusted grinding conditions to be stored as the new grinding conditions in the grinding condition storing section 42 (S14). Thereafter, the estimation apparatus 4 estimates the evaluation result of the evaluation object that is obtained under the adjusted new grinding conditions (S15).

After the step S15, the assistance apparatus 100 acquires the new grinding conditions stored in the grinding condition storing section 42 of the estimation apparatus 4, as status information, and further acquires the estimated evaluation result of the evaluation object as the evaluation result (S16). Next, the reward calculating section 130 calculates a reward (evaluation for the action information) for the adjusted grinding conditions, based on the estimated evaluation result (S17).

After the step S17, the value function updating section 180 updates the value function stored in the value function storing section 140, based on the new status information and the reward for the status information (S18). In the step S18, the value function updating section 180 may omit the updation of the value function in accordance with the reinforcement learning algorithm. Each time when a reward is calculated, namely, the value function updating section 180 may update the value function based on the reward, or, after the calculation of a reward is performed at a predetermined number of times, may calculate the average value, dispersion (for example, the standard deviation), and the like of the calculated rewards, and then may update the value function based on the average value of the rewards. Only when he calculated reward is a plus reward, alternatively, the value function updating section 180 may update the value function, or, only when the difference between the calculated reward or penalty and a preset reference value is large, may update the value function.

After the step S18, the policy updating section 190 updates the policy stored in the policy storing section 150, based on the updated value function (S19). Thereafter, the assistance apparatus 100 determines whether the first learning step (S1) is to be ended or not (S20). For example, the user may set the situation where the estimation apparatus 4 performs the simulation of the grinding process a predetermined number of times (for example, 1,000 times), as the conditions for ending the first learning step (S1). In the assistance apparatus 100, if the conditions for ending the first learning step (S1) are satisfied (S20: Yes), the step is ended, and, if the conditions for ending the first learning step (S1) are not satisfied (S20: No), the control is returned to the step S12.

In this way, the assistance apparatus 100 can perform, in the first learning step (S1), reinforcement learning without actually conducting a grinding process. In the assistance apparatus 100, therefore, it is possible to in the initial stage of the first learning step, avoid generation of a cost caused by occurrence of a defective product or early wear of the grinding wheel 16, and the policy can be improved in a short period of time.

(6-2. Second Learning Step)

Next, the second learning step (S2) that is executed in the learning step will be described with reference to the flowchart shown in FIG. 10.

Figure 10:
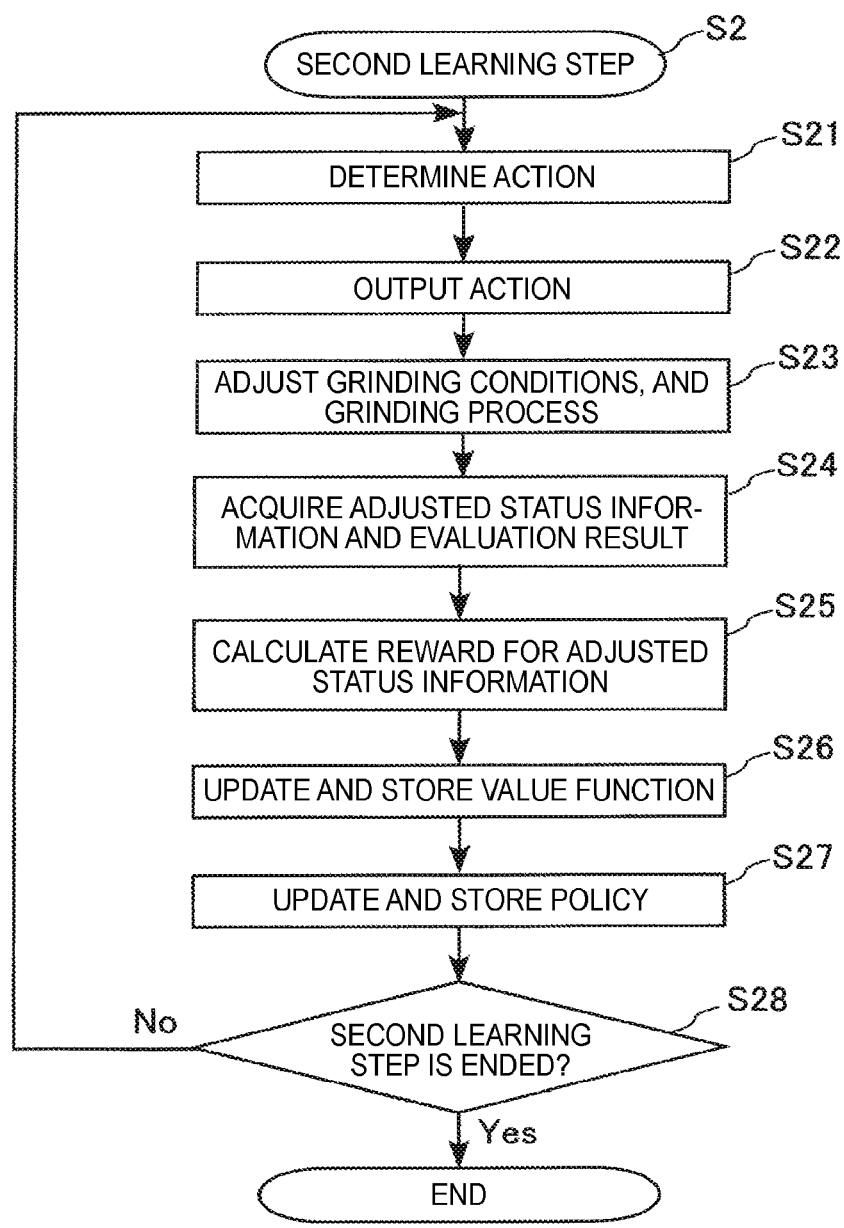
FIG. 10 is a flowchart showing a second learning step that is executed in the learning step.

As shown in FIG. 10, the action determining section 160 selects movement command data to be adjusted, as the first step that is executed in the second learning step (S2) from a plurality of candidates of movement command data that can be adjusted, and determines the adjustment amount of the selected movement command data (S21). The step S21 is similar to the step S12 in the first learning step (S1). Thereafter, the action information outputting section 170 outputs the action information to the controller 20 based on the contents of the determination conducted by the action determining section 160 (S22).

After the step S22, the controller 20 adjusts the grinding conditions based on the action information that is acquired from the action information outputting section 170 and, under the adjusted new grinding conditions, controls the grinding machine 10 so as to perform an actual grinding process (S23). Thereafter, the status information acquiring section 110 acquires the adjusted new grinding conditions as new status information (adjusted status information), and the evaluation result acquiring section 120 acquires the evaluation result of the evaluation object that is obtained under the adjusted grinding conditions (S24).

After the step S24, the reward calculating section 130 calculates a reward for the new status information (evaluation for the action information), based on the evaluation result that is acquired by the evaluation result acquiring section 120 (S25). Then, the value function updating section 180 updates the value function stored in the value function storing section 140, based on the new status information and the reward for the new status information (S26). Thereafter, the policy updating section 190 updates the policy stored in the policy storing section 150, based on the updated value function (S27). The steps S25 to S27 are similar to the steps S17 to S19 in the first learning step (S1).

Thereafter, the assistance apparatus 100 determines whether the second learning step (S2) is to be ended or not (S28). For example, the user may set the situation where the grinding machine 10 performs the grinding process a predetermined number of times (for example, 1,000 times), as the conditions for ending the second learning step (S2). In the assistance apparatus 100, if the conditions for ending the second learning step (S2) are satisfied (S28: Yes), the step is ended, and, if the conditions for ending the second learning step (S2) are not satisfied (S28: No), the control is returned to the step S21.

In this way, the assistance apparatus 100 performs, in the second learning step (S2), reinforcement learning based on the evaluation result that is obtained in an actual grinding process using the grinding machine 10, and therefore the policy can be further improved.

In the learning phase, as described above, the assistance apparatus 100 performs reinforcement learning in which grinding conditions including set states of a plurality of movement command data are set as the status information, and movement command data to be adjusted, and adjustment amounts of the movement command data are set as the action information. While performing reinforcement learning based on the status information and the reward for the status information, then, the assistance apparatus 100 updates the value function and policy for determining the action information, whereby the policy can be improved.

Moreover, the evaluation result acquiring section 120 can acquire both results of estimated evaluations that are estimated by the grinding quality estimation apparatus 50 and the wear amount estimation apparatus 60, and evaluation results that are obtained when a grinding process is actually performed by using the grinding machine 10. In accordance with the progress of the reinforcement learning or the like, the assistance apparatus 100 can acquire one of results of estimated evaluations that are estimated by the grinding quality estimation apparatus 50 and the wear amount estimation apparatus 60, and evaluation results that are obtained when a grinding process is actually performed. In the assistance apparatus 100, therefore, it is possible to avoid generation of a cost caused by occurrence of a defective product or early wear of the grinding wheel 16 while enhancing the learning efficiency of reinforcement learning.

(7. Configurations of Assistance Apparatus 100 that Function in Estimating Phase)

Figure 11:
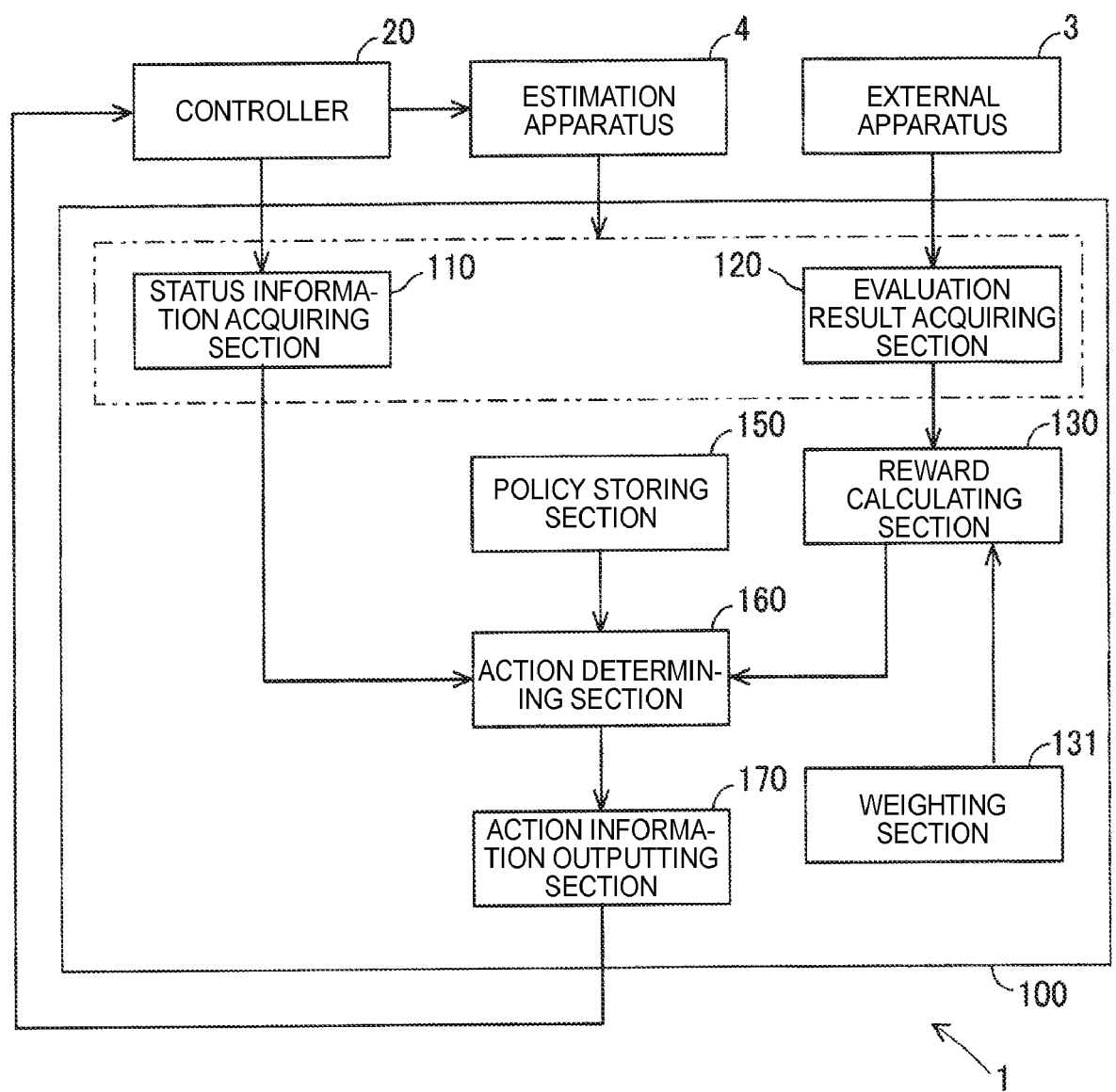
FIG. 11 is a functional block diagram showing the configuration of an estimating phase of the assistance apparatus.

Next, the configurations of the assistance apparatus 100 that function in an estimating phase will be described with reference to FIG. 11. As shown in FIG. 11, the assistance apparatus 100 includes the following configurations as the configurations that function in the estimating phase. That is, the assistance apparatus 100 mainly includes the status information acquiring section 110, the evaluation result acquiring section 120, the reward calculating section 130, the policy storing section 150, the action determining section 160, and the action information outputting section 170. The above-described configurations of the assistance apparatus 100 that function in the estimating phase are equivalent to the corresponding configurations of the assistance apparatus 100 that function in the learning phase.

In addition, the assistance apparatus 100 further includes a weighting section 131 that performs a weighting process on a reward which is provided to each of a plurality of evaluation objects by the reward calculating section 130. In the case where the importance of a part of the plurality of evaluation objects is higher than that of other evaluation objects, the weighting section 131 increases the degree of the reward or penalty that is provided to the part of evaluation objects to be larger than that of the reward or penalty that is provided to the other evaluation objects. The user can set the degree of weighting of reward for each of the evaluation objects.

In the case where the grinding quality of the workpiece W that is a part of the evaluation objects is higher in importance than the grinding qualities of the other evaluation objects, when the grinding quality is good, for example, the weighting section 131 sets the reward for the status information to be higher than as usual, and, by contrast, when the grinding quality is not good, sets the penalty for the status information to be higher than as usual. Therefore, the assistance apparatus 100 can determine an action (movement command data to be adjusted, and an adjustment amount of the movement command data) that achieves optimum grinding conditions according to the importance of the evaluation object. The weighting section 131 may be included in the configuration of the assistance apparatus 100 in the learning phase.

(8. Assisting Step)

Next, an assisting step that is executed by the grinding machine support system 1 will be described with reference to the flowchart shown in FIG. 12. In the flowchart shown in FIG. 12, the assisting step is started when the grinding process performed by the grinding machine 10 is ended.

Figure 12:
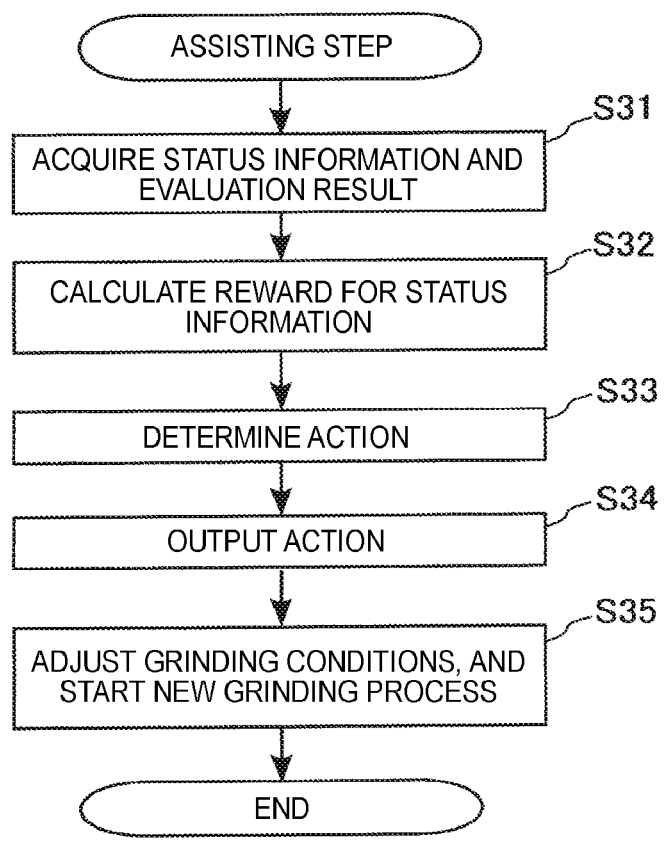
FIG. 12 is a flowchart showing an assisting step that is executed by the grinding machine support system.

As shown in FIG. 12, as the first one of steps that is executed in the assisting step, the status information acquiring section 110 acquires the grinding conditions that are set in the controller 20, as status information, and the evaluation result acquiring section 120 acquires the evaluation result of the evaluation object that is obtained under the grinding conditions (S31). The evaluation result acquiring section 120 may acquire the evaluation result of the evaluation object from the various sensors and the like disposed in the grinding machine 10, the external apparatus 3, and the estimation apparatus 4. In place of the evaluation result acquired from the external apparatus 3, the evaluation result acquiring section 120 may acquire results of estimations that are performed by the grinding quality estimation apparatus 50 and wear amount estimation apparatus 60 that are disposed in the estimation apparatus 4, as evaluation results. Then, the reward calculating section 130 calculates a reward for the status information based on the evaluation result acquired by the evaluation result acquiring section 120 (S32).

After the step S32, based on the status information acquired by the status information acquiring section 110 and the policy stored in the policy storing section 150, the action determining section 160 selects movement command data to be adjusted, from a plurality of candidates of movement command data that can be adjusted, and determines the adjustment amount of the selected movement command data (S33). Next, the action information outputting section 170 outputs the action information to the controller 20 based on the contents of the determination performed by the action determining section 160 (S34). Thereafter, the controller 20 adjusts the grinding conditions based on the action information that is acquired from the action information outputting section 170, and starts the new grinding process by the grinding machine 10 under the adjusted grinding conditions (S35).

When the step S35 is ended, the grinding machine support system 1 terminates the assisting step. Then, the grinding machine support system 1 starts a new assisting step at each time when the grinding process by the grinding machine 10 is ended.

In the estimating phase, as described above, the assistance apparatus 100 performs an action (determinations of movement command data to be adjusted, and an adjustment amount of the movement command data) according to the status information based on the policy obtained from the value function that is produced in the reinforcement learning of the learning phase. Moreover, the assistance apparatus 100 outputs action information according to the determined action to the controller 20, thereby assisting setting of the grinding conditions for the grinding process in the grinding machine 10.

In regard to this point, a process that is more accurate than a cutting process and the like is requested particularly in the grinding process using the grinding machine 10. In the grinding process using the grinding machine 10, on the other hand, the grinding wheel 16 is worn as the grinding process advances, and the diameter of the grinding wheel 16 is changed. During a period when the grinding conditions are changed from moment to moment in this way, it is not easy to adjust the movement command data so that a high evaluation result is attained for each of a plurality of evaluation objects.

By contrast, the assistance apparatus 100 outputs the action information relating to an action that is determined in accordance with the status information, to the controller 20, and the grinding machine 10 adjusts the movement command data based on the action information that is output from the assistance apparatus 100. Therefore, the grinding machine 10 can perform the grinding process in a state where the grinding conditions are optimized, with the result that it is possible to obtain an optimum evaluation result.

Based on the policy, moreover, the assistance apparatus 100 selects movement command data that are to be adjusted, and determines the adjustment amount of the selected movement command data. In this case, when a part of evaluation results of a plurality of evaluation objects is not good, the assistance apparatus 100 can perform adjustment of the grinding conditions in which the evaluation result that was not good is improved, while maintaining the evaluation results of evaluation objects that were good. That is, the assistance apparatus 100 can assist setting of the grinding conditions that cause the evaluation result of each of the plurality of evaluation objects, to become good.

In the case where the evaluation object is the grinding quality of the workpiece W that has been grounded, when the grinding quality of the workpiece W is not good, for example, the assistance apparatus 100 can adjust the movement command data by which the grinding quality can be improved. Examples of the situation where the grinding quality is not good are a case where an affected layer is caused in the workpiece W, that where the surface texture of the workpiece W is equal to or higher than a predetermined threshold, and that where a chatter pattern is produced in the workpiece W.

In the case where the evaluation object is the surface condition of the grinding wheel 16, moreover, the assistance apparatus 100 can perform truing or dressing on the grinding wheel 16 at the optimum timing in accordance with the surface condition of the grinding wheel 16. In the grinding machine 10, in this case, the tool life of the grinding wheel 16 can be prolonged as compared with the case where truing or dressing is performed when the surface condition of the grinding wheel 16 is good. Also in this case, the grinding machine 10 can reduce the number of stops of the grinding process due to truing or dressing, correspondingly to the reduction of the numbers of truing or dressing processes. In this case, moreover, the grinding machine 10 can be prevented from performing the grinding process in a state where the surface condition of the grinding wheel 16 is impaired, and therefore a defective product can be prevented from being produced.

In the case where the evaluation object is the wear amount of the grinding wheel 16, when the wear amount of the grinding wheel 16 in the grinding process of one workpiece W exceeds the reference, for example, the assistance apparatus 100 can adjust the movement command data so as to reduce the wear amount. In the assistance apparatus 100, therefore, the tool life of the grinding wheel 16 can be prolonged.

In the case where the evaluation object is the process time, when the process time exceeds the reference, the assistance apparatus 100 can adjust the movement command data so as to shorten the process time. In the grinding machine 10, therefore, the grinding cycle time can be shortened.

In the case where the evaluation object is the rate of operation of each of the grinding machines 10 in the grinding machine line 2, when the rate of operation of one of the grinding machines 10 is lower than the reference, in addition, the assistance apparatus 100 can adjust the movement command data so as to enhance the rate of operation of the one grinding machine 10. In the case where there is a step that becomes a bottle neck in set production planning, the rate of operation of a part of the grinding machines 10 constituting the grinding machine line 2 is sometimes lowered. In the assistance apparatus 100, by contrast, the process time of each of the grinding machines 10 can be adjusted in accordance with the step that becomes a bottle neck. In the assistance apparatus 100, for example, the process time of the steps that are other than the step that becomes a bottle neck is ensured to be long, whereby the grinding quality of the workpiece W and the wear amount of the grinding wheel 16 can be improved.

In the case where the evaluation object is the power consumption of the grinding machine 10, when the power consumption exceeds the reference, the assistance apparatus 100 can adjust the movement command data so as to reduce the power consumption. Therefore, the grinding machine 10 can reduce the power consumption. In the case where the evaluation object is the processing load that is applied to the workpiece W in the grinding process, when the processing load exceeds the reference, the assistance apparatus 100 can adjust the movement command data so as to reduce the processing load. In the grinding machine 10, therefore, the grinding resistance during the grinding process can be suppressed.

In the case where the evaluation object is the degree of the dispersion of the grinding quality, when the degree of the dispersion exceeds the reference, the assistance apparatus 100 can adjust the movement command data so as to reduce the dispersion. In the case where the driving process is performed in environments of different air temperatures of places where the grinding machines 10 are disposed, and different temperatures of the components 15 and the like, even when the other grinding conditions are same, for example, there is a case where evaluation results of the grinding qualities are different from one another. In the case where there is a tendency that, in the learning phase, the degree of the dispersion of the grinding quality due to the air temperatures of the places where the grinding machines 10 are placed, and the temperatures of the components 15 and the like becomes large, by contrast, the assistance apparatus 100 can produce a policy that adjusts the movement command data in accordance with the air temperatures of the place where the grinding machine 10 is placed, and the temperatures of the components 15 and the like.

In the case where the degree of the dispersion of the grinding quality is set as the evaluation object, the assistance apparatus 100 calculates the degree of the dispersion of the grinding quality at the timing when a predetermined number of grinding processes or simulations of the grinding process are performed. For example, the assistance apparatus 100 obtains the standard deviation of the difference between the grinding quality and the reference, thereby calculating the degree of the dispersion of the grinding quality. Alternatively, the degree of the dispersion of the grinding quality may be calculated by the external apparatus 3.

(9. Others)

Although the invention has been described with reference to the above-described embodiment, the invention is not limited to the embodiment, and it can be easily inferred that various modifications and changes can be made without departing from the spirit of the invention. Although the case where, in the learning step, the first learning step (S1) is first performed, and then the second learning step (S2) is performed has been exemplarily described, for example, only the second learning step (S2) may be performed in the learning step.

What is claimed is:

1. An assistance apparatus for assisting at least one grinding machine including a controller, the assistance apparatus comprising:
  a status information acquiring section that acquires a grinding condition as a status information, the grinding condition including set states associated with a plurality of movement command data that are controllable with the controller of the at least one grinding machine;
  an evaluation result acquiring section that acquires evaluation results of a plurality of evaluation objects that are obtained under the grinding condition, the evaluation objects being predetermined;
  a reward calculating section that calculates a reward for the status information based on the evaluation results;
  a policy storing section that stores a policy which is obtained from a value function, the value function being produced in a reinforcement learning that is based on the status information and the reward, the policy being configured to adjust the movement command data which corresponds to the status information such that the evaluation results are optimum;
  an action determining section that determines the movement command data to be adjusted and an adjustment amount at which said movement command data is adjusted, from among candidates of the plurality of movement command data that are adjustable, based on the status information and the policy;
  an action information outputting section that is configured to output contents determined by the action determining section to the controller, the contents including an action information;
  an evaluation result estimation model storing section that stores an evaluation result estimation model of indicating a relationship between the status information and the evaluation result; and
  an evaluation result estimating section that estimates the evaluation result which is obtained under adjusted grinding conditions, based on the status information and the evaluation result estimation model,
  wherein the evaluation objects include at least one of:
    a grinding quality of a workpiece on which a grinding process is performed by the at least one grinding machine;
    a surface condition or a wear amount of a grinding wheel after the grinding process; and
    a process time that is required to perform the grinding process of the workpiece,
  wherein the evaluation result acquiring section is configured to acquire the estimated evaluation result as the evaluation result, the estimated evaluation result being estimated by the evaluation result estimating section,
  wherein the evaluation result estimation model storing section stores a thermal displacement amount calculation model as the evaluation result estimation model, the thermal displacement amount calculation model indicating a relationship between the status information and the thermal displacement amount of a structural member of the at least one grinding machine, and
  wherein the evaluation result estimating section calculates the wear amount of the grinding wheel based on the thermal displacement amount and the status information, the thermal displacement amount being calculated based on the status information and the thermal displacement amount calculation model.

2. The assistance apparatus according to claim 1, wherein, in a case where the grinding quality is equal to or higher than a preset reference, the reward calculating section provides a plus reward.

3. The assistance apparatus according to claim 1, wherein, in a case where the surface condition of the grinding wheel is equal to or higher than a first preset reference, or the wear amount of the grinding wheel is equal to or lower than a second preset reference, the reward calculating section provides a plus reward.

4. The assistance apparatus according to claim 1, wherein, in a case where the process time is equal to or lower than a preset reference, the reward calculating section provides a plus reward.

5. The assistance apparatus according to claim 1,
wherein the evaluation objects further include a power consumption of the at least one grinding machine, and
wherein, in a case where the power consumption is equal to or lower than a preset reference, the reward calculating section provides a plus reward.

6. The assistance apparatus according to claim 1,
wherein the evaluation objects further include a processing load that is applied to the workpiece in the grinding process, and
wherein, in a case where the processing load is equal to or lower than a preset reference, the reward calculating section provides a plus reward.

7. The assistance apparatus according to claim 1,
wherein the at least one grinding machine includes a plurality of grinding machines, and a grinding machine line is configured from the plurality of grinding machines,
wherein the evaluation objects further include a rate of operation for each of the grinding machines in the grinding machine line, and
wherein, in a case where the rate of operation is equal to or higher than a preset reference, the reward calculating section provides a plus reward.

8. The assistance apparatus according to claim 1, wherein the assistance apparatus further comprises a weighting section that weights the reward which the reward calculating section providing for each of the evaluation objects.

9. The assistance apparatus according to claim 1, wherein the grinding condition further includes a temperature at a place where the at least one grinding machine is placed, or a temperature of the at least one grinding machine.

10. The assistance apparatus according to claim 9,
wherein the evaluation objects further include a degree of dispersion of the grinding quality, and
wherein, in a case where the degree of dispersion is equal to or lower than a preset reference, the reward calculating section provides a plus reward.

11. The assistance apparatus according to claim 1, wherein the evaluation result acquiring section is configured to acquire at least one of the estimated evaluation result and the evaluation result that is obtained when a grinding process is actually performed by using the at least one grinding machine.

12. The assistance apparatus according to claim 1,
wherein the evaluation result estimation model storing section stores a grinding quality estimation model as the evaluation result estimation model, the grinding quality estimation model indicating a relationship between the status information and the grinding quality, and
wherein the evaluation result estimating section estimates a grinding quality of the workpiece that is subjected to a grinding process under the grinding conditions, based on the status information and the grinding quality estimation model.

13. An assistance method for assisting a grinding machine, using the assistance apparatus for assisting a grinding machine according to claim 1, the assistance method comprising:
as a first learning, calculating the reward while using the estimated evaluation result as the evaluation result, the estimated evaluation result being estimated by the evaluation result estimating section,
as the first learning, updating the value function stored in the value function storing section, and subsequently updating the policy based on the updated value function,
as a second learning, calculating the reward based on the evaluation result that is obtained when a grinding process is actually performed, and
as the second learning, updating the value function stored in the value function storing section.

14. An assistance apparatus for assisting at least one grinding machine including a controller, the assistance apparatus comprising:
a status information acquiring section that acquires a grinding condition as a status information, the grinding condition including set states associated with a plurality of movement command data that are controllable with the controller of the at least one grinding machine;
an evaluation result acquiring section that acquires evaluation results of a plurality of evaluation objects that are obtained under the grinding condition, the evaluation objects being predetermined;
a reward calculating section that calculates a reward for the status information based on the evaluation results;
a value function storing section that stores a value function which is produced in a reinforcement learning that is based on the status information and the reward;
a policy storing section that stores a policy which is obtained from the value function, the policy being configured to adjust the movement command data which corresponds to the status information such that the evaluation results are optimum;
an action determining section that determines the movement command data to be adjusted and an adjustment amount at which said movement command data is adjusted, from among candidates of the plurality of movement command data that are adjustable, based on the status information and the policy;
an action information outputting section that is configured to output contents determined by the action determining section to the controller, the contents including an action information;
a value function updating section that is configured to update the value function stored in the value function storing section, based on an adjusted status information that is obtained by adjusting the status information based on the action information, and the reward for the adjusted status information;
a policy updating section that updates the policy based on the updated value function;

an evaluation result estimation model storing section that stores an evaluation result estimation model of indicating a relationship between the status information and the evaluation result; and an evaluation result estimating section that estimates the evaluation result which is obtained under the adjusted grinding conditions, based on the status information and the evaluation result estimation model, wherein the evaluation objects include at least one of:
- a grinding quality of a workpiece on which a grinding process is performed by the at least one grinding machine;
- a surface condition or a wear amount of a grinding wheel after the grinding process; and
- a process time that is required to perform the grinding process of the workpiece, wherein the evaluation result acquiring section is configured to acquire the estimated evaluation result as the evaluation result, the estimated evaluation result being estimated by the evaluation result estimating section, wherein the evaluation result estimation model storing section stores a thermal displacement amount calculation model as the evaluation result estimation model, the thermal displacement amount calculation model indicating a relationship between the status information and the thermal displacement amount of a structural member of the at least one grinding machine, and wherein the evaluation result estimating section calculates the wear amount of the grinding wheel based on the thermal displacement amount and the status information, the thermal displacement amount being calculated based on the status information and the thermal displacement amount calculation model.

15. The assistance apparatus according to claim 14, wherein at least one of:
- in a case where the grinding quality is equal to or higher than a preset reference, the reward calculating section provides a plus reward,
- in a case where the surface condition of the grinding wheel is equal to or higher than a first preset reference, or the wear amount of the grinding wheel is equal to or lower than a second preset reference, the reward calculating section provides a plus reward,
- in a case where the process time is equal to or lower than a preset reference, the reward calculating section provides a plus reward,
- the evaluation objects further include a power consumption of the at least one grinding machine, and, in a case where the power consumption is equal to or lower than a preset reference, the reward calculating section provides a plus reward,
- the evaluation objects further include a processing load that is applied to the workpiece in the grinding process, and, in a case where the processing load is equal to or lower than a preset reference, the reward calculating section provides a plus reward, and
- the at least one grinding machine includes a plurality of grinding machines, and a grinding machine line is configured from the plurality of grinding machines, the evaluation objects further include a rate of operation for each of the grinding machines in the grinding machine line, and, in a case where the rate of operation is equal to or higher than a preset reference, the reward calculating section provides a plus reward.

16. The assistance apparatus according to claim 14, wherein the assistance apparatus further comprises a weighting section that weights the reward which the reward calculating section providing for each of the evaluation objects.

17. The assistance apparatus according to claim 14, wherein
- the grinding condition further includes a temperature at a place where the at least one grinding machine is placed, or a temperature of the at least one grinding machine,
- the evaluation objects further include a degree of dispersion of the grinding quality, and
- in a case where the degree of dispersion is equal to or lower than a preset reference, the reward calculating section provides a plus reward.

18. The assistance apparatus according to claim 14, wherein the evaluation result acquiring section is configured to acquire at least one of the estimated evaluation result and the evaluation result that is obtained when a grinding process is actually performed by using the at least one grinding machine.

19. The assistance apparatus according to claim 14,
wherein the evaluation result estimation model storing section stores a grinding quality estimation model as the evaluation result estimation model, the grinding quality estimation model indicating a relationship between the status information and the grinding quality, and wherein the evaluation result estimating section estimates a grinding quality of the workpiece that is subjected to a grinding process under the grinding conditions, based on the status information and the grinding quality estimation model.

20. An assistance method for assisting a grinding machine, using the assistance apparatus for assisting a grinding machine according to claim 14, the assistance method comprising:
- as a first learning, calculating the reward while using the estimated evaluation result as the evaluation result, the estimated evaluation result being estimated by the evaluation result estimating section,
- as the first learning, updating the value function stored in the value function storing section, and subsequently updating the policy based on the updated value function,
- as a second learning, calculating the reward based on the evaluation result that is obtained when a grinding process is actually performed, and
- as the second learning, updating the value function stored in the value function storing section.

* * * * *